(12) United States Patent
Kennedy et al.

(10) Patent No.: US 8,849,058 B2
(45) Date of Patent: Sep. 30, 2014

(54) SYSTEMS AND METHODS FOR IMAGE ARCHAEOLOGY

(75) Inventors: Lyndon Kennedy, San Francisco, CA (US); Shih-Fu Chang, New York, NY (US)

(73) Assignee: The Trustees of Columbia University in the City of New York

( * ) Notice: Subject to any disclaimer, the term of this patent is extended or adjusted under 35 U.S.C. 154(b) by 696 days.

(21) Appl. No.: 12/861,377

(22) Filed: Aug. 23, 2010

(65) Prior Publication Data

US 2011/0025710 A1      Feb. 3, 2011

Related U.S. Application Data

(63) Continuation of application No. PCT/US2009/040029, filed on Apr. 9, 2009.

(60) Provisional application No. 61/043,982, filed on Apr. 10, 2008.

(51) Int. Cl.
*G06K 9/32* (2006.01)
*G06K 9/40* (2006.01)
*G06K 9/20* (2006.01)
*G06F 17/30* (2006.01)
*G06T 11/60* (2006.01)
*G06T 7/00* (2006.01)
*G06T 7/20* (2006.01)

(52) U.S. Cl.
CPC .............. *G06T 7/0022* (2013.01); *G06T 11/60* (2013.01); *G06T 7/2053* (2013.01)
USPC ............ 382/274; 382/294; 382/284; 707/710

(58) Field of Classification Search
USPC ........... 382/286, 284, 294, 305, 195; 345/629
See application file for complete search history.

(56) References Cited

U.S. PATENT DOCUMENTS

| 4,649,380 A | 3/1987 | Pena |
| 4,712,248 A | 12/1987 | Hongo |

(Continued)

FOREIGN PATENT DOCUMENTS

| EP | 0579319 | 1/1994 |
| EP | 0587329 | 3/1994 |

(Continued)

OTHER PUBLICATIONS

Popescu et al, Exposing Digital Forgeries by Detecting Traces of Resampling, IEEE Transactions on Signal Processing, vol. 53, No. 2, Feb. 2005.*

(Continued)

*Primary Examiner* — Andrae S Allison
(74) *Attorney, Agent, or Firm* — Baker Botts, L.L.P.

(57) ABSTRACT

Systems and methods are described for determining manipulation history among a plurality of images. The described techniques include selecting a pair of images from the plurality of images, detecting one or more manipulations operable to transform one of the images to the other, and based on the manipulations detected, determining a parent-child relationship between the pair or pairs of images. The described techniques can further include repeating the selecting two images, detecting manipulations, and determining the parent-child relationship for each pairs of images in the plurality of images, constructing a visual migration map for the images, and presenting the visual migration map in a user readable format.

17 Claims, 17 Drawing Sheets

(56) References Cited

U.S. PATENT DOCUMENTS

| | | |
|---|---|---|
| 5,144,685 A | 9/1992 | Nasar et al. |
| 5,191,645 A | 3/1993 | Carlucci et al. |
| 5,204,706 A | 4/1993 | Saito |
| 5,208,857 A | 5/1993 | Lebrat |
| 5,262,856 A | 11/1993 | Lippman et al. |
| 5,408,274 A | 4/1995 | Chang et al. |
| 5,428,774 A | 6/1995 | Takahashi et al. |
| 5,461,679 A | 10/1995 | Normile et al. |
| 5,465,353 A | 11/1995 | Hull et al. |
| 5,488,664 A | 1/1996 | Shamir |
| 5,493,677 A | 2/1996 | Balogh et al. |
| 5,530,759 A | 6/1996 | Braudaway et al. |
| 5,546,571 A | 8/1996 | Shan et al. |
| 5,546,572 A | 8/1996 | Seto et al. |
| 5,555,354 A | 9/1996 | Strasnick et al. |
| 5,555,378 A | 9/1996 | Gelman et al. |
| 5,557,728 A | 9/1996 | Garrett et al. |
| 5,566,089 A | 10/1996 | Hoogenboom |
| 5,572,260 A | 11/1996 | Onishi et al. |
| 5,579,444 A | 11/1996 | Dalziel et al. |
| 5,579,471 A | 11/1996 | Barber et al. |
| 5,585,852 A | 12/1996 | Agarwal |
| 5,606,655 A | 2/1997 | Arman et al. |
| 5,613,032 A | 3/1997 | Cruz et al. |
| 5,615,112 A | 3/1997 | Lui Sheng et al. |
| 5,617,119 A | 4/1997 | Briggs et al. |
| 5,623,690 A | 4/1997 | Palmer et al. |
| 5,630,121 A | 5/1997 | Braden-Harder et al. |
| 5,642,477 A | 6/1997 | de Carmo et al. |
| 5,655,117 A | 8/1997 | Goldberg et al. |
| 5,664,018 A | 9/1997 | Leighton |
| 5,664,177 A | 9/1997 | Lowry |
| 5,668,897 A | 9/1997 | Stolfo |
| 5,684,715 A | 11/1997 | Palmer |
| 5,694,334 A | 12/1997 | Donahue et al. |
| 5,694,945 A | 12/1997 | Ben-Haim |
| 5,696,964 A | 12/1997 | Cox et al. |
| 5,701,510 A | 12/1997 | Johnson et al. |
| 5,708,805 A | 1/1998 | Okamoto et al. |
| 5,713,021 A | 1/1998 | Kondo et al. |
| 5,721,815 A | 2/1998 | Ottesen et al. |
| 5,724,484 A | 3/1998 | Kagami et al. |
| 5,734,752 A | 3/1998 | Knox |
| 5,734,893 A | 3/1998 | Li et al. |
| 5,742,283 A | 4/1998 | Kim |
| 5,751,286 A | 5/1998 | Barber et al. |
| 5,758,076 A | 5/1998 | Wu et al. |
| 5,767,922 A | 6/1998 | Zabih et al. |
| 5,768,578 A | 6/1998 | Kirk et al. |
| 5,790,703 A | 8/1998 | Wang |
| 5,794,178 A | 8/1998 | Caid et al. |
| 5,794,242 A | 8/1998 | Green et al. |
| 5,802,361 A | 9/1998 | Wang et al. |
| 5,805,733 A | 9/1998 | Wang et al. |
| 5,805,804 A | 9/1998 | Laursen et al. |
| 5,809,139 A | 9/1998 | Girod et al. |
| 5,809,160 A | 9/1998 | Powell et al. |
| 5,821,945 A | 10/1998 | Yeo et al. |
| 5,822,524 A | 10/1998 | Chen et al. |
| 5,825,892 A | 10/1998 | Braudaway et al. |
| 5,848,155 A | 12/1998 | Cox |
| 5,852,435 A | 12/1998 | Vigneaux et al. |
| 5,852,823 A | 12/1998 | De Bonet |
| 5,870,754 A | 2/1999 | Dimitrova et al. |
| 5,873,080 A | 2/1999 | Coden et al. |
| 5,884,298 A | 3/1999 | Smith et al. |
| 5,887,061 A | 3/1999 | Sato |
| 5,893,095 A | 4/1999 | Jain et al. |
| 5,915,027 A | 6/1999 | Cox et al. |
| 5,930,783 A | 7/1999 | Li et al. |
| 5,937,422 A | 8/1999 | Nelson et al. |
| 5,943,422 A | 8/1999 | Van Wie et al. |
| 5,949,885 A | 9/1999 | Leighton |
| 5,960,081 A | 9/1999 | Vynne et al. |
| 5,963,203 A | 10/1999 | Goldberg et al. |
| 5,969,755 A | 10/1999 | Courtney |
| 5,983,218 A | 11/1999 | Syeda-Mahmood |
| 5,987,459 A | 11/1999 | Swanson et al. |
| 5,995,095 A | 11/1999 | Ratakonda |
| 5,995,978 A | 11/1999 | Cullen et al. |
| 6,031,914 A | 2/2000 | Tewfik et al. |
| 6,037,984 A | 3/2000 | Isanardi et al. |
| 6,041,079 A | 3/2000 | Yim |
| 6,047,374 A | 4/2000 | Barton |
| 6,058,186 A | 5/2000 | Enari |
| 6,058,205 A | 5/2000 | Bahl et al. |
| 6,064,764 A | 5/2000 | Bhaskaran et al. |
| 6,070,167 A | 5/2000 | Qian et al. |
| 6,070,228 A | 5/2000 | Belknap et al. |
| 6,072,542 A | 6/2000 | Wilcox et al. |
| 6,075,875 A | 6/2000 | Gu |
| 6,078,664 A | 6/2000 | Moskowitz et al. |
| 6,079,566 A | 6/2000 | Eleftheriadis et al. |
| 6,081,278 A | 6/2000 | Chen |
| 6,092,072 A | 7/2000 | Guha et al. |
| 6,100,930 A | 8/2000 | Kolczynski |
| 6,104,411 A | 8/2000 | Ito et al. |
| 6,108,434 A | 8/2000 | Cox et al. |
| 6,115,717 A | 9/2000 | Mehrotra et al. |
| 6,122,403 A | 9/2000 | Rhoads |
| 6,125,229 A | 9/2000 | Dimitrova et al. |
| 6,154,755 A | 11/2000 | Dellert et al. |
| 6,157,745 A | 12/2000 | Salembier |
| 6,157,746 A | 12/2000 | Sodagar et al. |
| 6,167,084 A | 12/2000 | Wang et al. |
| 6,172,675 B1 | 1/2001 | Ahmad et al. |
| 6,178,416 B1 | 1/2001 | Thompson et al. |
| 6,185,329 B1 | 2/2001 | Zhang et al. |
| 6,195,458 B1 | 2/2001 | Warnick et al. |
| 6,208,735 B1 | 3/2001 | Cox et al. |
| 6,208,745 B1 | 3/2001 | Florencio et al. |
| 6,222,932 B1 | 4/2001 | Rao et al. |
| 6,223,183 B1 | 4/2001 | Smith et al. |
| 6,236,395 B1 | 5/2001 | Sezan et al. |
| 6,240,424 B1 | 5/2001 | Hirata |
| 6,243,419 B1 | 6/2001 | Satou et al. |
| 6,246,804 B1 | 6/2001 | Sato et al. |
| 6,252,975 B1 | 6/2001 | Bozdagi et al. |
| 6,269,358 B1 | 7/2001 | Hirata |
| 6,275,599 B1 | 8/2001 | Adler et al. |
| 6,282,299 B1 | 8/2001 | Tewfik et al. |
| 6,282,300 B1 | 8/2001 | Bloom et al. |
| 6,285,995 B1 | 9/2001 | Abdel-Mottaleb et al. |
| 6,297,797 B1 | 10/2001 | Takeuchi et al. |
| 6,327,390 B1 | 12/2001 | Sun et al. |
| 6,332,030 B1 | 12/2001 | Manjunath et al. |
| 6,339,450 B1 | 1/2002 | Chang et al. |
| 6,356,309 B1 | 3/2002 | Masaki et al. |
| 6,360,234 B2 | 3/2002 | Jain et al. |
| 6,366,314 B1 | 4/2002 | Goudezeune et al. |
| 6,366,701 B1 | 4/2002 | Chalom et al. |
| 6,385,329 B1 | 5/2002 | Sharma et al. |
| 6,385,602 B1 | 5/2002 | Tso et al. |
| 6,393,394 B1 | 5/2002 | Ananthapadmanabhan et al. |
| 6,404,925 B1 | 6/2002 | Foote et al. |
| 6,418,232 B1 | 7/2002 | Nakano et al. |
| 6,418,421 B1 | 7/2002 | Hurtado et al. |
| 6,442,538 B1 | 8/2002 | Nojima |
| 6,453,053 B1 | 9/2002 | Wakasu |
| 6,466,940 B1 | 10/2002 | Mills |
| 6,473,459 B1 | 10/2002 | Sugano et al. |
| 6,476,814 B1 | 11/2002 | Garvey |
| 6,487,301 B1 | 11/2002 | Zhao |
| 6,499,105 B1 | 12/2002 | Yoshiura et al. |
| 6,526,099 B1 | 2/2003 | Christopoulos et al. |
| 6,532,541 B1 | 3/2003 | Chang et al. |
| 6,546,135 B1 | 4/2003 | Lin et al. |
| 6,549,911 B2 | 4/2003 | Gustman |
| 6,556,695 B1 | 4/2003 | Packer et al. |
| 6,556,958 B1 | 4/2003 | Chickering |
| 6,560,284 B1 | 5/2003 | Girod et al. |
| 6,567,805 B1 | 5/2003 | Johnson et al. |
| 6,581,058 B1 | 6/2003 | Fayyad et al. |
| 6,606,329 B1 | 8/2003 | Herrmann |

(56) References Cited

U.S. PATENT DOCUMENTS

| | | |
|---|---|---|
| 6,606,393 B1 | 8/2003 | Xie et al. |
| 6,628,824 B1 | 9/2003 | Belanger |
| 6,643,387 B1 | 11/2003 | Sethuraman et al. |
| 6,654,931 B1 | 11/2003 | Haskell et al. |
| 6,678,389 B1 | 1/2004 | Sun et al. |
| 6,683,966 B1 | 1/2004 | Tian et al. |
| 6,700,935 B2 | 3/2004 | Lee |
| 6,701,309 B1 | 3/2004 | Beeferman et al. |
| 6,708,055 B2 | 3/2004 | Geiser et al. |
| 6,714,909 B1 | 3/2004 | Gibbon et al. |
| 6,716,175 B2 | 4/2004 | Geiser et al. |
| 6,718,047 B2 | 4/2004 | Rhoads |
| 6,721,733 B2 | 4/2004 | Lipson et al. |
| 6,725,372 B1 | 4/2004 | Lewis et al. |
| 6,735,253 B1 | 5/2004 | Chang et al. |
| 6,741,655 B1 | 5/2004 | Chang et al. |
| 6,757,407 B2 | 6/2004 | Bruckstein et al. |
| 6,778,223 B2 | 8/2004 | Abe |
| 6,792,434 B2 | 9/2004 | Moghaddam et al. |
| 6,807,231 B1 | 10/2004 | Wiegand et al. |
| 6,816,836 B2 | 11/2004 | Basu et al. |
| 6,847,980 B1 | 1/2005 | Benitez et al. |
| 6,879,703 B2 | 4/2005 | Lin et al. |
| 6,886,013 B1 | 4/2005 | Beranek |
| 6,940,910 B2 | 9/2005 | Jun et al. |
| 6,941,325 B1 | 9/2005 | Benitez et al. |
| 6,950,542 B2* | 9/2005 | Roesch et al. ............... 382/128 |
| 6,970,602 B1 | 11/2005 | Smith et al. |
| 7,010,751 B2 | 3/2006 | Shneiderman |
| 7,072,398 B2 | 7/2006 | Ma |
| 7,093,028 B1 | 8/2006 | Shao et al. |
| 7,103,225 B2 | 9/2006 | Yang et al. |
| 7,143,434 B1 | 11/2006 | Paek et al. |
| 7,145,946 B2 | 12/2006 | Lee |
| 7,154,560 B1 | 12/2006 | Chang et al. |
| 7,184,959 B2 | 2/2007 | Gibbon et al. |
| 7,185,049 B1 | 2/2007 | Benitez et al. |
| 7,254,285 B1 | 8/2007 | Paek et al. |
| 7,308,443 B1 | 12/2007 | Lee et al. |
| 7,313,269 B2 | 12/2007 | Xie et al. |
| 7,327,885 B2 | 2/2008 | Divakaran et al. |
| 7,339,992 B2 | 3/2008 | Chang et al. |
| 7,386,806 B2 | 6/2008 | Wroblewski |
| 7,398,275 B2 | 7/2008 | Rising et al. |
| 7,403,302 B2 | 7/2008 | Gann |
| 7,406,409 B2 | 7/2008 | Otsuka et al. |
| 7,409,144 B2 | 8/2008 | McGrath et al. |
| 7,437,004 B2 | 10/2008 | Baatz et al. |
| 7,496,830 B2 | 2/2009 | Rubin et al. |
| 7,519,217 B2 | 4/2009 | Liu et al. |
| 7,574,409 B2 | 8/2009 | Patinkin |
| 7,624,337 B2 | 11/2009 | Sull et al. |
| 7,636,662 B2 | 12/2009 | Dimtrva et al. |
| 7,653,264 B2* | 1/2010 | Hero et al. ............... 382/294 |
| 7,653,635 B1 | 1/2010 | Paek et al. |
| 7,676,820 B2 | 3/2010 | Snijder et al. |
| 7,720,851 B2 | 5/2010 | Chang et al. |
| 7,733,956 B1 | 6/2010 | Kalra et al. |
| 7,738,550 B2 | 6/2010 | Kuhn |
| 7,756,338 B2 | 7/2010 | Wilson et al. |
| 7,773,813 B2 | 8/2010 | Hua et al. |
| 7,809,192 B2 | 10/2010 | Gokturk et al. |
| 7,817,722 B2 | 10/2010 | Chang et al. |
| 7,817,855 B2 | 10/2010 | Yuille et al. |
| 7,860,317 B2* | 12/2010 | Xie et al. ............... 382/195 |
| 7,884,567 B2 | 2/2011 | Kim et al. |
| 7,996,762 B2 | 8/2011 | Qi et al. |
| 8,010,296 B2 | 8/2011 | Loo et al. |
| 8,019,763 B2 | 9/2011 | Wang et al. |
| 8,135,221 B2 | 3/2012 | Jiang et al. |
| 8,145,677 B2 | 3/2012 | Al-Shameri |
| 8,218,617 B2 | 7/2012 | Kim et al. |
| 8,332,333 B2 | 12/2012 | Agarwal |
| 8,520,949 B1 | 8/2013 | Bissacco et al. |
| 2001/0000962 A1 | 5/2001 | Rajan |
| 2002/0021828 A1 | 2/2002 | Papier et al. |
| 2002/0118748 A1 | 8/2002 | Inomata et al. |
| 2002/0124104 A1 | 9/2002 | Rappaport et al. |
| 2002/0157116 A1 | 10/2002 | Jasinschi |
| 2002/0169771 A1 | 11/2002 | Melmon et al. |
| 2003/0013951 A1 | 1/2003 | Stefanescu et al. |
| 2003/0046018 A1 | 3/2003 | Kohlmorgen et al. |
| 2003/0195883 A1 | 10/2003 | Mojsilovic et al. |
| 2003/0229278 A1 | 12/2003 | Sinha |
| 2004/0057081 A1* | 3/2004 | Kubota ............... 358/3.28 |
| 2004/0131121 A1 | 7/2004 | Dumitras et al. |
| 2004/0210819 A1 | 10/2004 | Alonso |
| 2005/0076055 A1 | 4/2005 | Mory et al. |
| 2005/0201619 A1 | 9/2005 | Sun et al. |
| 2005/0210043 A1* | 9/2005 | Manasse ............... 707/100 |
| 2005/0238238 A1 | 10/2005 | Xu et al. |
| 2006/0026588 A1 | 2/2006 | Illowsky et al. |
| 2006/0167784 A1 | 7/2006 | Hoffberg |
| 2006/0200260 A1 | 9/2006 | Hoffberg et al. |
| 2006/0206882 A1 | 9/2006 | Illowsky et al. |
| 2006/0224532 A1 | 10/2006 | Duan et al. |
| 2006/0258419 A1 | 11/2006 | Winkler et al. |
| 2006/0293921 A1 | 12/2006 | McCarthy et al. |
| 2007/0033170 A1 | 2/2007 | Sull et al. |
| 2007/0038612 A1 | 2/2007 | Sull et al. |
| 2007/0044010 A1 | 2/2007 | Sull et al. |
| 2007/0047816 A1 | 3/2007 | Graham et al. |
| 2007/0078846 A1* | 4/2007 | Gulli et al. ............... 707/5 |
| 2007/0087756 A1 | 4/2007 | Hoffberg |
| 2007/0165904 A1 | 7/2007 | Nudd et al. |
| 2007/0174790 A1 | 7/2007 | Jing et al. |
| 2007/0195106 A1* | 8/2007 | Lin et al. ............... 345/589 |
| 2007/0217676 A1 | 9/2007 | Grauman et al. |
| 2007/0237426 A1* | 10/2007 | Xie et al. ............... 382/305 |
| 2007/0245400 A1 | 10/2007 | Paek et al. |
| 2008/0055479 A1 | 3/2008 | Shehata et al. |
| 2008/0082426 A1 | 4/2008 | Gokturk et al. |
| 2008/0097939 A1 | 4/2008 | Guyon et al. |
| 2008/0181308 A1 | 7/2008 | Wang et al. |
| 2008/0193016 A1 | 8/2008 | Lim et al. |
| 2008/0222670 A1 | 9/2008 | Lee et al. |
| 2008/0266300 A1 | 10/2008 | Deering et al. |
| 2008/0298464 A1 | 12/2008 | Hinz et al. |
| 2008/0303942 A1 | 12/2008 | Chang et al. |
| 2008/0304743 A1 | 12/2008 | Tang et al. |
| 2009/0055094 A1 | 2/2009 | Suzuki |
| 2009/0132561 A1 | 5/2009 | Cormode et al. |
| 2009/0290635 A1 | 11/2009 | Kim et al. |
| 2009/0316778 A1 | 12/2009 | Kim et al. |
| 2010/0082614 A1 | 4/2010 | Yang et al. |
| 2010/0172591 A1 | 7/2010 | Ishikawa |
| 2010/0205509 A1 | 8/2010 | Kirschner et al. |
| 2010/0332210 A1 | 12/2010 | Birdwell et al. |
| 2011/0064136 A1 | 3/2011 | Chang et al. |
| 2011/0081892 A1 | 4/2011 | Graham et al. |
| 2011/0093492 A1 | 4/2011 | Sull et al. |
| 2011/0145232 A1 | 6/2011 | Chang et al. |
| 2011/0238698 A1 | 9/2011 | Asikainen et al. |
| 2011/0255605 A1 | 10/2011 | Chang et al. |
| 2011/0283111 A1 | 11/2011 | Bister et al. |
| 2011/0314367 A1 | 12/2011 | Chang et al. |
| 2012/0089552 A1 | 4/2012 | Chang et al. |
| 2012/0109858 A1 | 5/2012 | Makadia et al. |
| 2014/0064091 A1 | 3/2014 | Basso et al. |

FOREIGN PATENT DOCUMENTS

| | | |
|---|---|---|
| EP | 0953938 | 11/1999 |
| JP | 2004049471 | 2/1992 |
| JP | 1996317384 | 11/1996 |
| WO | WO98/33323 | 7/1998 |
| WO | WO00/28440 | 5/2000 |
| WO | WO00/49797 | 8/2000 |

OTHER PUBLICATIONS

S. Bayram, I. Avcibas, B. Sankur, N. Memon, "Image manipulation detection with binary similarity measures," in proc. EUSIPCO, 2005, pp. 752-755.*

(56) References Cited

OTHER PUBLICATIONS

Fridrich et al, Detecting digital image forgeries using sensor pattern noise, Proc. SPIE 6072, Security, Steganography, and Watermarking of Multimedia Contents VIII, 60720Y (Feb. 16, 2006).*
U.S. Appl. No. 11/448,114, Nov. 21, 2011 Final Office Action.
U.S. Appl. No. 10/965,040, Nov. 2, 2011 Notice of Appeal.
Gholamhosein et al., "Semantic Clustering and Querying on Heterogeneous Features for Visual Data", *Proceedings of the ACM Multimedia 98, MM '98, Bristol, Sep. 12-16, 1998, ACM International Multimedia Conference*, New York, NY: ACM, US, vol. Conf. 6, Sep. 12, 1998, pp. 3-12, XP000977482.
U.S. Appl. No. 11/615,120, Apr. 6, 2010 Issue Fee payment.
U.S. Appl. No. 11/615,120, Jan. 14, 2010 Notice of Allowance.
U.S. Appl. No. 11/615,120, Sep. 4, 2009 Response to Non-Final Office Action.
U.S. Appl. No. 11/615,120, May 4, 2009 Non-Final Office Action.
U.S. Appl. No. 12/574,716, Feb. 1, 2012 Issue Fee payment.
U.S. Appl. No. 12/574,716, Nov. 10, 2011 Notice of Allowance.
U.S. Appl. No. 10/965,040, Mar. 15, 2012 Notice of Allowance.
Amir et al., "IBM research TRECVID-2003 video retrieval system", *Proc. NIST Test Retrieval Conf. (TREC)*, 2003.
Anemueller et al., "Biologically motivated audio-visual cue integration for object categorization", *Proc. International Conference on Cognitive Systems*, 2008.
Barzelay et al., "Harmony in motion", *Proc. IEEE Conference Computer Vision and Pattern Recognition*, pp. 1-8, 2007.
Beal et al., "A graphical model for audiovisual object tracking", *IEEE Trans. Pattern Analysis and Machine Intelligence*, 25:828-836, 2003.
Chang et al., "Large-scale multimodal semantic concept detection for consumer video", *Proc. 9th ACM SIGMM International Workshop on Multimedia Information Retrieval*, 2007.
Chen et al., "Image categorization by learning and reasoning with regions", *Journal of Machine Learning Research*, 5:913-939, 2004.
Cristani et al., "Audio-visual event recognition in surveillance video sequences", *IEEE Trans. Multimedia*, 9:257-267, 2007.
Dalal et al., "Histograms of oriented gradients for human detection", *Proc. IEEE Conference Computer Vision and Pattern Recognition*, pp. 886-893, 2005.
Deng et al., "Unsupervised segmentation of color-texture regions in images and video", *IEEE Trans. Pattern Analysis and Machine Intelligence*, 23:800-810, 2001.
Friedman, et al., "Additive logistic regression: a statistical view of boosting", *Annals of Statistics*, 28:337-407, 2000.
Han et al. "Incremental density approximation and kernel-based bayesian filtering for object tracking", *Proc. IEEE Conference Computer Vision and Pattern Recognition*, pp. 638-644, 2004.
Hellman et al., "Probability of error, equivocation, and the chernoff bound", *IEEE Trans. on Information Theory*, 16(4):368-372, 1970.
Hershey et al., "Audio-vision: using audio-visual synchrony to locate sounds", *Proc. Advances in Neural Information Processing Systems*, 1999.
Iwano et al., "Audio-visual speech recognition using lip information extracted from side-face images", *EURASIP Journal on Audio, Speech, and Music Processing*, 2007.
Lowe "Distinctive image features from scale-invariant keypoints", *International Journal of Computer Vision*, 60:91-110, 2004.
Lucas, et al. "An iterative image registration technique with an application to stereo vision", *Proc. Imaging understanding workshop*, pp. 121-130, 1981.
Mallat et al., "Matching pursuits with time-frequency dictionaries", *IEEE Transaction on Signal Processing*, 41(2): 3397-3415, 1993.
Maron et al., "A framework for multiple-instance learning", *Proc. Advances in Neural Information Processing Systems*, pp. 570-576, 1998.
Naphade et al., "A factor graph fraemwork for semantic video indexing", *IEEE Trans on CSVT*, 12(1):40-52, 2002.
Ogle et al., "Fingerprinting to identify repeated sound events in long-duration personal audio recordings", *Proc. Int. Conf. Acoustics, Speech and Signal Processing*, pp. I-233-I-236, 2007.
Pack et al., "Experiments in constructing belief networks for image classification systems", *Proc. ICIP*, Vancouver, Canada, 2000.
Smith et al., "Multimedia semantic indexing using model vectors", *Proc. ICME*, 3:445-448, 2003.
Vasconcelos, eature selection by maximum marginal diversity: optimality and implications for visual recognition, *CVPR* 1:762-769, 2003.
Wang et al., "Learning Semantic Scene Models by Trajectory Analysis", *Proc. European Conference on Computer Vision*, pp. 110-123, 2006.
Wu, et al., "Multimodal information fusion for video concept detection," Proc. International Conference Image Processing, pp. 2391-2394, 2004.
Yang et al., "Region-based image annotation using asymmetrical support vector machine-based multiple-instance learning", *Proc. IEEE Conference Computer Vision and Pattern Recognition*, pp. 2057-2063, 2006.
Zhou et al., "Object tracking using sift features and mean shift," *Computer Vision and Image Understanding*, 113:345-352, 2009.
U.S. Appl. No. 11/448,114, May 16, 2012 Notice of Appeal.
U.S. Appl. No. 11/448,114, Jul. 9, 2012 Amendment and Request for Examination (RCE).
U.S. Appl. No. 10/965,040, Jun. 7, 2012 Issue Fee payment.
U.S. Appl. No. 12/969,101, May 24, 2012 Non-Final Office Action.
U.S. Appl. No. 11/960,424, Jun. 29, 2012 Non-Final Office Action.
U.S. Appl. No. 11/846,088, Jun. 7, 2012 Non-Final Office Action.
International Search Report PCT/US09/40029 May 29, 2009.
U.S. Appl. No. 11/448,114, Jan. 2, 2013 Issue Fee payment.
U.S. Appl. No. 11/448,114, Oct. 2, 2012 Notice of Allowance.
U.S. Appl. No. 12/874,337, Aug. 23, 2012 Restriction Requirement.
U.S. Appl. No. 12/969,101, Dec. 21, 2012 Issue Fee payment.
U.S. Appl. No. 12/969,101, Oct. 9, 2012 Notice of Allowance.
U.S. Appl. No. 13/165,553, Nov. 23, 2012 Restriction Requirement.
U.S. Appl. No. 11/960,424, Dec. 31, 2012 Terminal Disclaimer Decision.
U.S. Appl. No. 11/960,424, Dec. 20, 2012 Response to Non-Final Office Action and Terminal Disclaimer filed.
U.S. Appl. No. 12/548,199, Feb. 12, 2013 Response to Non-Final Office Action.
U.S. Appl. No. 12/548,199, Oct. 16, 2012 Non-Final Office Action.
U.S. Appl. No. 11/846,088, Nov. 29, 2012 Response to Non-Final Office Action.
U.S. Appl. No. 10/482,074, filed Dec. 24, 2003 (Abandoned).
U.S. Appl. No. 13/078,626, filed Apr. 1, 2011.
U.S. Appl. No. 13/165,553, filed Jun. 21, 2011.
U.S. Appl. No. 09/423,770, filed Nov. 12, 1999 (Abandoned).
U.S. Appl. No. 10/333,030, filed Jun. 6, 2003 (Abandoned).
U.S. Appl. No. 09/623,277, filed Sep. 1, 2000 (Abandoned).
U.S. Appl. No. 10/149,685, filed Jun. 13, 2002 (Abandoned).
U.S. Appl. No. 09/359,836, filed Jul. 23, 1999 (Abandoned).
U.S. Appl. No. 10/491,460, filed Apr. 1, 2004 (Abandoned).
U.S. Appl. No. 10/482,074, Jun. 18, 2008 Notice of Abandonment.
U.S. Appl. No. 10/482,074, Nov. 14, 2007 Non-Final Office Action.
U.S. Appl. No. 10/965,040, Aug. 10, 2011 Advisory Action.
U.S. Appl. No. 10/965,040, Aug. 2, 2011 Response to Final Office Action.
U.S. Appl. No. 10/965,040, May 13, 2011 Final Office Action.
U.S. Appl. No. 10/965,040, Feb. 25, 2011 Response to Non-Final Office Action.
U.S. Appl. No. 10/965,040, Oct. 29, 2010 Non-Final Office Action.
U.S. Appl. No. 11/448,114, Jul. 8, 2011 Non-Final Office Action.
U.S. Appl. No. 11/448,114, Apr. 27, 2011 Response to Non-Final Office Action.
U.S. Appl. No. 11/448,114, Oct. 28, 2010 Non-Final Office Action.
U.S. Appl. No. 11/448,114, Apr. 1, 2010 Amendment and Request for Continued Examination (RCE).
U.S. Appl. No. 11/506,060, filed Aug. 16, 2006 (Abandoned).
U.S. Appl. No. 11/448,114, Nov. 25, 2009 Final Office Action.
U.S. Appl. No. 11/448,114, Oct. 19, 2009 Response to Non-Compliant Response.
U.S. Appl. No. 11/448,114, Oct. 6, 2009 Notice of Non-Compliant Response.

(56) References Cited

OTHER PUBLICATIONS

U.S. Appl. No. 11/448,114, Aug. 12, 2009 Response to Non-Final Office Action.
U.S. Appl. No. 11/448,114, Mar. 16, 2009 Non-Final Office Action.
U.S. Appl. No. 09/423,770, Feb. 20, 2004 Notice of Abandonment.
U.S. Appl. No. 09/423,770, Jul. 2, 2003 Non-Final Office Action.
U.S. Appl. No. 10/333,030, Jun. 25, 2010 Notice of Abandonment.
U.S. Appl. No. 10/333,030, Sep. 22, 2009 Non-Final Office Action.
U.S. Appl. No. 10/333,030, Jul. 9, 2009 Amendment and Request for Continued Examination (RCE).
U.S. Appl. No. 10/333,030, Feb. 26, 2009 Final Office Action.
U.S. Appl. No. 10/333,030, Nov. 21, 2008 Response to Non-Final Office Action.
U.S. Appl. No. 10/333,030, May 22, 2008 Non-Final Office Action.
U.S. Appl. No. 10/333,030, Apr. 15, 2008 Supplemental Response to Notice of Non-Compliant.
U.S. Appl. No. 10/333,030, Apr. 10, 2008 Response to Notice of Non-Compliant.
U.S. Appl. No. 10/333,030, Feb. 15, 2008 Notice of Non-Compliant.
U.S. Appl. No. 10/333,030, Jan. 24, 2008 Amendment and Request for Continued Examination (RCE).
U.S. Appl. No. 10/333,030, Oct. 25, 2007 Final Office Action.
U.S. Appl. No. 10/333,030, Aug. 28, 2007 Response to Non-Final Office Action.
U.S. Appl. No. 10/333,030, Apr. 30, 2007 Non-Final Office Action.
U.S. Appl. No. 10/333,030, Mar. 20, 2007 Response to Non-Final Office Action.
U.S. Appl. No. 10/333,030, Dec. 20, 2006 Non-Final Office Action.
U.S. Appl. No. 09/423,409, Nov. 21, 2003 Notice of Allowance.
U.S. Appl. No. 09/423,409, Nov. 6, 2003 Response to Final Office Action.
U.S. Appl. No. 09/423,409, Aug. 7, 2003 Final Office Action.
U.S. Appl. No. 09/423,409, Jun. 2, 2003 Response to Non-Final Office Action.
U.S. Appl. No. 09/423,409, Dec. 10, 2002 Non-Final Office Action.
U.S. Appl. No. 09/623,277, Mar. 23, 2006 Notice of Abandonment.
U.S. Appl. No. 09/623,277, Aug. 10, 2005 Restriction Requirement.
U.S. Appl. No. 09/607,974, Jul. 9, 2004 Notice of Allowance.
U.S. Appl. No. 09/607,974, Apr. 26, 2004 Response to Non-Final Office Action.
U.S. Appl. No. 09/607,974, Dec. 11, 2003 Non-Final Office Action.
U.S. Appl. No. 09/607,974, Nov. 10, 2003 Request for Continued Examination (RCE).
U.S. Appl. No. 09/607,974, Sep. 3, 2003 Advisory Action.
U.S. Appl. No. 09/607,974, Jul. 30, 2003 Response to Final Office Action.
U.S. Appl. No. 09/607,974, May 9, 2003 Final Office Action.
U.S. Appl. No. 09/607,974, Apr. 4, 2003 Response to Notice of Informality or Non-Responsive Amendment.
U.S. Appl. No. 09/607,974, Feb. 24, 2003 Notice of Informal or Non-Responsive Amendment.
U.S. Appl. No. 09/607,974, Jan. 8, 2003 Response to Non-Final Office Action.
U.S. Appl. No. 09/607,974, Jul. 1, 2002 Non-Final Office Action.
U.S. Appl. No. 09/530,308, Apr. 20, 2006 Notice of Allowance.
U.S. Appl. No. 09/530,308, Jan. 23, 2006 Response to Non-Final Office Action.
U.S. Appl. No. 09/530,308, Oct. 20, 2005 Non-Final Office Action.
U.S. Appl. No. 09/530,308, Jul. 11, 2005 Filed Appeal Brief.
U.S. Appl. No. 09/530,308, May 12, 2005 Filed Notice of Appeal.
U.S. Appl. No. 09/530,308, Feb. 9, 2005 Final Office Action.
U.S. Appl. No. 09/530,308, Sep. 27, 2004 Response to Non-Final Office Action.
U.S. Appl. No. 09/530,308, Mar. 24, 2004 Non-Final Office Action.
U.S. Appl. No. 09/530,308, Jan. 12, 2004 Response to Non-Final Office Action.
U.S. Appl. No. 09/530,308, Oct. 2, 2003 Non-Final Office Action.
U.S. Appl. No. 09/530,308, Jul. 14, 2003 Response to Non-Final Office Action.
U.S. Appl. No. 09/530,308, Nov. 20, 2002 Non-Final Office Action.
U.S. Appl. No. 10/220,776, Aug. 23, 2004 Notice of Allowance.
U.S. Appl. No. 10/149,685, Feb. 7, 2008 Notice of Abandonment.
U.S. Appl. No. 10/149,685, Jul. 31, 2007 Non-Final Office Action.
U.S. Appl. No. 10/149,685, May 7, 2007 Response to Non-Final Office Action.
U.S. Appl. No. 10/149,685, Feb. 6, 2007 Non-Final Office Action.
U.S. Appl. No. 09/889,859, Mar. 22, 2004 Notice of Allowance.
U.S. Appl. No. 09/889,859, Jan. 12, 2004 Response to Non-Final Office Action.
U.S. Appl. No. 09/889,859, Sep. 10, 2003 Non-Final Office Action.
U.S. Appl. No. 09/359,836, Mar. 17, 2008 Notice of Abandonment.
U.S. Appl. No. 09/359,836, Aug. 10, 2007 Final Office Action.
U.S. Appl. No. 09/359,836, May 11, 2007 Response to Non-Final Office Action.
U.S. Appl. No. 09/359,836, Dec. 15, 2006 Non-Final Office Action.
U.S. Appl. No. 09/359,836, Sep. 21, 2006 Amendment and Request for Continued Examination (RCE).
U.S. Appl. No. 09/359,836, May 18, 2004 Final Office Action.
U.S. Appl. No. 09/359,836, Mar. 5, 2004 Response to Non-Final Office Action.
U.S. Appl. No. 09/359,836, Aug. 29, 2003 Non-Final Office Action.
U.S. Appl. No. 09/830,899, Nov. 4, 2009 Notice of Allowance.
U.S. Appl. No. 09/830,899, Oct. 1, 2009 Request for Continued Examination (RCE).
U.S. Appl. No. 09/830,899, Sep. 4, 2009 Notice of Allowance.
U.S. Appl. No. 09/830,899, Jun. 29, 2009 Response to Non-Final Office Action.
U.S. Appl. No. 09/830,899, Feb. 2, 2009 Non-Final Office Action.
U.S. Appl. No. 09/830,899, Dec. 22, 2008 Response to Non-Final Office Action.
U.S. Appl. No. 09/830,899, Oct. 9, 2008 Non-Final Office Action.
U.S. Appl. No. 09/830,899, Jul. 15, 2008 Amendment and Request for Continued Examination.
U.S. Appl. No. 09/830,899, May 16, 2007 Filed Reply Brief.
U.S. Appl. No. 09/830,899, Apr. 5, 2007 Examiner's Answer to Appeal Brief.
U.S. Appl. No. 09/830,899, Dec. 18, 2006 Filed Appeal Brief.
U.S. Appl. No. 09/830,899, Nov. 3, 2006 Filed Notice of Appeal.
U.S. Appl. No. 09/830,899, Jul. 3, 2006 Final Office Action and Examiner Interview Summary.
U.S. Appl. No. 09/830,899, Apr. 13, 2006 Non-Final Office Action.
U.S. Appl. No. 09/830,899, Mar. 3, 2006 Filed Appeal Brief.
U.S. Appl. No. 09/830,899, Feb. 15, 2006 Notice of Defective Appeal Brief.
U.S. Appl. No. 09/830,899, Dec. 19, 2005 Filed Appeal Brief.
U.S. Appl. No. 09/830,899, Nov. 9, 2005 Pre-Appeal Brief Conference Decision.
U.S. Appl. No. 09/830,899, Oct. 17, 2005 Amendment, Notice of Appeal and Pre-Appeal Brief Request.
U.S. Appl. No. 09/830,899, Jul. 5, 2005 Final Office Action.
U.S. Appl. No. 09/830,899, Dec. 27, 2004 Response to Notice of Non-Compliant.
U.S. Appl. No. 09/830,899, Dec. 7, 2004 Notice of Non-Compliant.
U.S. Appl. No. 09/830,899, Jul. 6, 2004 Amendment and Request for Continued Examination (RCE).
U.S. Appl. No. 09/830,899, Mar. 12, 2004 Final Office Action.
U.S. Appl. No. 09/830,899, Dec. 11, 2003 Response to Non-Final Office Action.
U.S. Appl. No. 09/830,899, Aug. 13, 2003 Non-Final Office Action.
U.S. Appl. No. 10/491,460, Jul. 11, 2006 Notice of Abandonment.
U.S. Appl. No. 10/728,345, Jun. 15, 2010 Notice of Allowance.
U.S. Appl. No. 10/728,345, Mar. 10, 2010 Response to Non-Final Office Action.
U.S. Appl. No. 10/728,345, Dec. 24, 2009 Non-Final Office Action.
U.S. Appl. No. 10/728,345, Oct. 5, 2009 Amendment and Request for Continued Examination (RCE).
U.S. Appl. No. 10/728,345, Jul. 9, 2009 Final Office Action.
U.S. Appl. No. 10/728,345, Apr. 9, 2009 Response to Non-Final Office Action.
U.S. Appl. No. 10/728,345, Dec. 10, 2008 Non-Final Office Action.
U.S. Appl. No. 10/728,345, Sep. 30, 2008 Response to Non-Final Office Action.
U.S. Appl. No. 10/728,345, Jun. 30, 2008 Non-Final Office Action.

(56) References Cited

OTHER PUBLICATIONS

U.S. Appl. No. 10/494,739, Oct. 10, 2007 Notice of Allowance.
U.S. Appl. No. 09/831,215, Sep. 6, 2006 Notice of Allowance.
U.S. Appl. No. 09/235,862, Oct. 25, 2002 Notice of Allowance.
U.S. Appl. No. 09/235,862, Oct. 21, 2002 Supplemental Response to Final Office Action.
U.S. Appl. No. 09/235,862, Oct. 10, 2002 Advisory Action.
U.S. Appl. No. 09/235,862, Sep. 30, 2002 Response to Final Office Action.
U.S. Appl. No. 09/235,862, Apr. 22, 2002 Final Office Action.
U.S. Appl. No. 09/235,862, Mar. 12, 2002 Response to Non-Final Office Action.
U.S. Appl. No. 09/235,862, Nov. 7, 2001 Non-Final Office Action.
U.S. Appl. No. 09/831,218, Mar. 1, 2006 Notice of Allowance.
U.S. Appl. No. 09/831,218, Feb. 10, 2006 Response to Final Office Action.
U.S. Appl. No. 09/831,218, Dec. 29, 2005 Final Office Action.
U.S. Appl. No. 09/831,218, Nov. 28, 2005 Response to Non-Final Office Action.
U.S. Appl. No. 09/831,218, Aug. 24, 2005 Non-Final Office Action.
U.S. Appl. No. 11/506,060, May 10, 2011 Final Office Action.
U.S. Appl. No. 11/506,060, Apr. 12, 2011 Response to Non-Final Office Action.
U.S. Appl. No. 11/506,060, Oct. 19, 2010 Non-Final Office Action.
U.S. Appl. No. 11/506,060, Mar. 3, 2010 Amendment and Request for Continued Examination (RCE).
U.S. Appl. No. 11/506,060, Nov. 18, 2009 Final Office Action.
U.S. Appl. No. 11/506,060, Aug. 13, 2009 Response to Non-Final Office Action.
Infotouch: An Explorative Multi-Touch Interface for Tagged Photo Collections. Linkoping University. Purportedly posted to Youtube on May 31, 2007 (http://www.youtube.com/watch?v=DHMJJwouq51). p. 1.
Zavesky et al., "Low-Latency Query Formulation and Result Exploration for Concept-Based Visual Search,", ACM Multimedia Information Retrieval Conference, Oct. 2008, Vancouver, Canada; pp. 1-23.
Dimitrova et al., "Motion Recovery for Video Contect Classification,", Arizona State University, Temple; Transactions on Information Systems; Oct. 13, 1995; No. 4, pp. 408-439; New York, NY, U.S.A.
Chang et al., "Multimedia Search and Retrieval", Published as a chapter in Advances in Multimedia: System, Standard, and Networks, A. Puri and T. Chen (eds.). New York: Marcel Dekker, 1999; pp. 559-584.
M. Bierling, "Displacement Estimation by Hierarchical Block Matching", SPIE Visual Commun. & Image Processing (1988) vol. 1001; pp. 942-951.
Hirata et al., "Query by Visual Example, Content Based Image Retrieval, Advances in Database Technology—EDBT"; Lecture Notes in Computer Science (1992, A. Pirotte et al. eds.)vol. 580; pp. 56-71.
T. Minka, "An Image Database Browed that Learns from User Interaction" MIT Media Laboratory Perceptual Computing Section, TR#365 (1996); pp. 1-55.
W. Niblack et al. "The QBIC Project: Querying Images by Content Using Color, Texture and Shape" in Storage and Retrieval for Image and Video Databases, Wayne Niblack, Editor, Proc. SPIE 1908, pp. 173-181 (1993).
U.S. Appl. No. 11/506,060, Mar. 11, 2009 Non-Final Office Action.
Saber et al., "Region-based shape matching for automatic image annotation and query-by-example" 8 Visual Comm. and Image Representation (1997) pp. 1-40.
Sun, et al., "Architectures for MPEG Compressed Bitstream Scaling." Transactions On Circuits and Systems for Video Technology, vol. 6(2), Apr. 1996.
MPEG-7 Requirements; Oct. 1998.
MPEG-7 Context and Objectives; Oct. 1998.
MPEG-7 Proposal Package Description; Oct. 1998.
Oomoto E et al: "OVID: design and implementation of a video-object database system" IEEE Transactions on Knowledge and Data Engineering, IEEE, Inc. New York, US, vol. 5, No. 4, Aug. 1993, pp. 629-643, XP002134326 ISSN: 1041-4347.
Chung-Sheng Li et al: "Multimedia content descriptioin in the InfoPyramid" Acoustics, Speech and Signal Processing, 1998. Porceedings of the 1998 IEEE International Conference on Seattle, WA, USA May 12-15, 1998, New York, NY USA, IEEE, US, May 12, 1998, pp. 3789-3792, XP010279595 ISBN: 0-7803-4428-6.
Bayram et al.: "Image Manipulation Detection,", Journal of Electronic Imaging 15(4), 041102, (Oct.-Dec. 2006).
Fridich et al.: "Detection of Copy-Move Forgery in Digital Images", *Proc. of DFRWS 2003*, Cleveland, OH, USA, Aug. 5-8, 2003.
Sato et al., "Video OCR: Indexing digital news libraries by recognition of superimposed captions", Multimedia Systems, 7:385-394, 1999.
Trier et al.m "Feature extraction methods for character recognition—A survey", Pattern Recognition, vol. 29, pp. 641-662, 1996.
Tse et al., "Global Zoom/Pan estimation and compensation for video compression" Proceedings of ICASSP 1991, pp. 2725-2728.
Zhong et al., "Structure analysis of sports video using domain models", IEEE International Conference on Multimedia and Expo., Aug. 22-25, 2001, Tokyo, Japan.
Akutsu et al., "Video indexing using motion vectors", SPIE Visual communications and Image Processing 1992, vol. 1818, pp. 1522-1530.
Arman et al., "Image processing on compressed data for large video databases", Proceedings of ACM Multimedia '93, Jun. 1993, pp. 267-272.
Smoliar et al., "Content-Based video indexing and Retrieval", IEEE Mulitmedia, Summer 1994, pp. 62-72.
Sawhney et al., "Model-Based 2D & 3D Dominant Motion Estimation of Mosaicking and Video Representation" Proc. Fifth Int'l Conf. Computer Vision, Los Alamitos, CA, 1995, pp. 583-590.
Yeung et al., "Video Browsing using clustering and scene transitions on compressed sequences" IS & T/SPIE Symposium Proceedings, Feb. 1995, vol. 2417, pp. 399-413.
Meng et al., "Scene change detection in a MPEG Compressed video Sequence" IS & T/SPIE Symposium proceedings, vol. 2419, Feb. 1995.
Zhong et al., "Clustering methods for video browsing and annotation" sotrage and retrieval for Still Image and Video Databases IV, IS&T/SPIE's electronic Images: science & Tech. 96, vol. 2670 (1996).
Shahraray, B. "Scene Change Detecton and Content-Based sampling of video Sequences" SPIE conf. Digital Image Compression: Algorithms and Technologies 1995, vol. 2419.
Leung et al., "Picture Retrieval by Content description", Journal of Information Science; No. 18, pp. 111-119, 1992.
Meng et al., "Tools for Compressed-Domain Video Indexing and Editing", SPIE conference on storage and retrieval for Image and video Database, vol. 2670 (1996).
Li et al., "Modeling of moving objects in a video database", Proceeding of IEEE International Conference on Multimedia Computing and systems, pp. 336-343; Jun. 1997.
Li et al., "Modeling video temporal relationships in an object database management system", IS&T/SPIE international Symposium on Electronic Imaging: Multimedia Computing and Networking, pp. 80-91, Feb. 1997.
Oria et al., "Modeling images for content-based queried: the DISIMA Approach", Second international Conference on Visual Information Systems, pp. 339-346: Jun. 1997.
Lin et al., "A Robust image authentication Method surviving JPEG lossy compression"; SPIE 1998; pp. 28-30.
Lin et al., "A Robust image authentication Method distinguishin JPEG compression form malicious manipulation"; CU/CRT Technical Report 486-97-119, Dec. 1997; pp. 1-43.
Walton, Steven, "Image authentication for a slippery new age, knowing when images have been changed", Dr. Dobb's 1995.
Schneider et al., "A Robust content based digital sugnature for image authentication", Columbia University, Image and Advanced Television Laboratory, NY; 1996; pp. 227-230.

(56) References Cited

OTHER PUBLICATIONS

Li et al., "Issues and solutions for authenticating MPEG video", Columbia University, Department of Electrical Engineering, NY, Jan. 1999; pp. 54-65.
Kliot et al., "Invariant-Based shape retrieval in pictorial databases", Computer Vision and Image Understanding; Aug. 1998; 71(2): 182-197.
Schmid et al., "Local grayvalue invariants for image retrieval" IEEE Transaction on Pattern Analysis and Machine Intelligence; May 1997; 19(5): 530-535.v.
Cox et al., "Secure spread spectrum watermaking for multimedia", NEC Research Institute, Technical Report 95-10, Dec. 4, 1995; pp. 1 of 1 and 1-33.
Jacobs et al., "Fast Multiresolution Image Querying," Proc of SIG-GRAPH, Los Angeles (Aug. 1995) pp. 277-286.
Kato et al., "Sketch Retrieval Method for Full Color Image Database—Query by Visual Example," Electro Technical Laboratory, MIDI, Tsukuba 305, Japan, IEEE (1992) pp. 530-532.
Netravali et al., Digital Pictures: Representation, Compression, and Standards, 2d. Ed., Plenum Press, New York and London (1995) pp. 340-344.
Del Bimbo et al., "Visual Image Retrieval by Elastic Matching of User Sketches," 19 IEEE Trans. on PAMI (1997) pp. 121-123.
Tong et al., "RUBRIC—An Environment for Full Text Information Retrieval," ACM, Jun. 1985, pp. 243-251.
Hjelsvold et al., "Searching and Browsing a Shared Video Database," IEEE, Aug. 1995, pp. 90-98.
Chabane Djeraba and Marinette Bouet "Digital Information Retrieval," Copyright 1997 ACM 0-89791-970-x/97/11 pp. 185-192.
Gong et al. (1995) "Automatic Parsing of TV Soccer Programs," IEEE, pp. 167-174.
John R. Smith (1999) "Digital Video Libraries and the Internet," IEEE, pp. 92-97.
Tonomura et al. (1990) "Content Oriented Visual Interface Using Video Icons for Visual Database Systems," Journal of Visual Languages and Computing, pp. 183-198.
Gunsel et al. (1998) "Temporal Video Segmentation Using Unsupervised Clustering and Semantic Object Tracking," Journal of Electronic Imaging 7(3), pp. 592-604.
Yoshinobu Tonomura (1991) "Video Handling Based on Structured Information for Hypermedia Systems," Proceedings of the International Conference on Multimedia Information Systems, pp. 333-344.
AMOS: An Active System for MPEG-4 Video Object Segmentation, Di Zhong and Shih-Chang, 647-651, o-8186-8821-1/98 (c) 1998 IEEE.
Gong Y. et al. A Generic Video Parsing System with a Scene Description Language (SDL). Real-Time Imaging, Feb. 1996, vol. 2, No. 1, pp. 45-49.
Russ, John C. The Image Processing Handbook. Boca Raton, Florida: CRC Press. 1995, 2nd ed., pp. 361-376.
Chang, S.-F. et al. VideoQ: An Automated Content-Based Video Search System Using Visual Cues. Proceedings ACM Multimedia 97, Seattle, WA, Nov. 9-13, 1997, pp. 313-324.
Chang, S.-F. Content-Based Indexing and Retrieval of Visual Information. IEEE Signal Processing Magazine. Jul. 1997, vol. 14, No. 4, pp. 45-48.
Li, W. et al. Vision: A Digital Video Library, Proceedings of the 1st ACM International Conference on Digital Libraries, Bethesda, MD, Mar. 20-23, 1996, pp. 19-27.
International Search Report PCT/US09/047492, Aug. 27, 2009.
International Search Report PCT/US99/26125, Apr. 3, 2000.
International Search Report PCT/US02/39247, Dec. 12, 2003.
International Search Report PCT/US00/34803, Oct. 29, 2001.
International Search Report PCT/US99/26126, May 10, 2000.
International Search Report PCT/US02/16599, Nov. 22, 2002.
International Search Report PCT/US02/31488, Feb. 4, 2003.
International Search Report PCT/US99/26127, Apr. 6, 2000.
International Search Report PCT/US10/023494, Apr. 1, 2000.
International Search Report PCT/US99/04776, May 14, 1999.
International Search Report PCT/US04/28722, Jun. 1, 2005.
International Search Report PCT/US06/007862, Mar. 29, 2007.
International Search Report PCT/US00/02488, May 25, 2000.
International Search Report PCT/US00/018231, Oct. 4, 2000.
International Search Report PCT/US09/069237, Mar. 1, 2010.
International Search Report PCT/US99/022790, Feb. 24, 1999.
International Search Report PCT/US99/22264, Feb. 11, 2000.
International Search Report PCT/US01/22485, May 11, 2003.
International Search Report PCT/US98/09124, Oct. 8, 1998.
International Search Report PCT/US03/12858, Nov. 25, 2003.
Geiger et al., "Dynamic Programming for Detecting, Tracking, and Matching Deformable Contours" IEEE Transactions on Pattern Analysis and Machine Intelligence, 17(3): 294-302, Mar. 1, 1995, XP000498121 *Abstract*.
M. Schaar, H. Radha, Adaptive motion-compensation fine-granular-scalability (AMC-FGS) for wireless video, IEEE Trans. on CSVT, vol. 12, No. 6, 360-371, 2002.
A. M. Tourapis. "Enhanced Predictive Zonal Search for Single and Multiple Frame Motion Estimation," Proceedings of Visual Communications and Image Processing 2002 (VCIP-2002), San Jose, CA, Jan. 2002, pp. 1069-1079.
H.-Y. Cheong, A. M. Tourapis, "Fast Motion Estimation within the H.264 codec," in proceedings of ICME-2003, Baltimore, MD, Jul. 6-9, 2003.
B. Girod, A. Aaron, S. Rane and D. Rebollo-Monedero , "Distributed video coding," *Proc. of the IEEE*, Special Issue on Video Coding and Delivery, 2005; pp. 1-12.
Z. He, Y. Liang, L. Chen, I. Ahmad, and D. Wu, "Power-Rate-Distortion Analysis for Wireless Video Communication under Energy Constraints," IEEE Transactions on Circuits and Systems for Video Technology, Special Issue on Integrated Multimedia Platforms, 2004.
K. Lengwehasatit and A. Ortega, "Rate Complexity Distortion Optimization for Quadtree-Based DCT Coding ",ICIP 2000, Vancouver,BC, Canada, Sep. 2000.
A. Ray and H. Radha, "Complexity-Distortion Analysis of H.264/ JVT Decoder on Mobile Devices," Picture Coding Symposium (PCS), Dec. 2004.
H. Kim and Y. Altunbasak, "Low-complexity macroblock mode selection for the H.264/AVC encoders," IEEE Int. Conf. on Image Processing, Suntec City, Singapore, Oct. 2004.
X. Lu, E. Erkip, Y. Wang and D. Goodman, "Power efficient multimedia communication over wireless channels", IEEE Journal on Selected Areas on Communications, Special Issue on Recent Advances in Wireless Multimedia, vol. 21, No. 10, pp. 1738-1751, Dec. 2003.
Q. Zhang, W. Zhu, Zu Ji, and Y. Zhang, "A Power-Optimized Joint Source Channel Coding for Scalable Video Streaming over Wireless Channel", IEEE International Symposium on Circuits and Systems (ISCAS) 2001, May 2001, Sydney, Australia.
Y. Eisenberg, C. E. Luna, T. N. Pappas, R. Berry, A.K. Katsaggelos, Joint source coding and transmission power management for energy efficient wireless video communications, CirSysVideo(12), No. 6, Jun. 2002, pp. 411-424.
National's PowerWise™ technology. http://www.national.com/appinfo/power/powerwise.html , Nov. 11, 2002.
X. Zhou, E. Li, and Y.-K. Chen, "Implementation of H.264 Decoder on General-Purpose Processors with Media Instructions", in Proc. of SPIE Visual Communications and Image Processing, Jan. 2003.
T.-C. Chen, Y.-C. Huang and L.-G. Chen, "Full Utilized and Resuable Architecture for Fractional Motion Estimation of H.264/AVC", ICASSP2004, Montreal, Canada, May 17-21, 2004.
T. Chiang and Y.-Q. Zhang, "A New Rate Control Scheme Using Quadratic Rate Distortion Model," IEEE Trans. Circuits Syst. Video Technol., vol. 7, pp. 246-250, Feb. 1997.
G. J. Sullivan and T. Wiegand, Rate-Distortion Optimization for Video Compression IEEE Signal Processing Magazine, vol. 15, No. 6, pp. 74-90, Nov. 1998.
A. M. Tourapis, F. Wu, S. Li, "Direct mode coding for bi-predictive pictures in the JVT standard", ISCAS2003, vol. 2, 700-703, Thailand, 2003.
V. Lappalainen, A. Hallapuro, and T.D. Hämäläinen, "Complexity of Optimized H.26L Video Decoder Implementation," IEEE Trans. Circuits Syst. Video Technol., vol. 13, pp. 717-725. Jul. 2003.

(56) References Cited

OTHER PUBLICATIONS

T. Wedi; H.G. Musmann, Motion- and aliasing-compensated prediction for hybrid video codingPage(s): IEEE Trans. Circuits Syst. Video Technol., vol. 13, pp. 577-586. Jul. 2003.
T. Wiegand, G. J. Sullivan, G. Bjontegaard, A. Luthra, "Overview of the H.264/AVC Video Coding Standard," IEEE Trans. Circuits Syst. Video Technol., vol. 13, pp. 560-576. Jul. 2003.
Wang, et al. "Dynamic rate scaling of coded digital video for IVOD applications." Transactions on Consumer Electronics, vol. 44(3), Aug. 1998, pp. 743-749.
Wee, et al., "Field-to-frame transcoding with spatial and temporal downsampling." Proceedings of the 1999 International Conference on Image Processing, vol. 4, Oct. 1999.
Wee, et al., "Secure scalable streaming enabling transcoding without decryption." Proceedings of the 2001 International Conference on Image Processing, vol. 1 of 3, Oct. 2001.
Wee, et al., "Secure scalable video streaming for wireless networks." Proceedings of the 2001 IEEE International Conference on Acoustics, Speech, and Signal Process, vol. 4 of 6, May 2001, pp. 2049-2052.
Sorial, et al., "Selective requantization for transcoding of MPEG compressed video." Proceedings of the 2000 IEEE International Conference on Multimrdia and Expo, vol. 1, 2000, pp. 217-220.
Kim, et al., "Description of Utility function based on optimum transcoding" ISO/IEC JTC1/SC/ WG11 MPEG02/M8319, Apr. 2002.
Mukherjee, et al., "Structured scalable meta-formsats (SSM) for digital item adaptation" Proceedings of the SPIE, SPIE, Bellingham, VA, US, vol. 5018, Jan. 2003, pp. 148-167.
Friedman, G.L., "The Trustworthy Digital Camera: Restoring Credibility to the Photographic Image", IEEE Transactions on Consumer Electronics, 39(4): 905-910; Nov. 1, 1993, XP000423080.
Lee et al., A Watermarking Sequence Using Parities of Error Control Coding for Image Authentication and Correction, IEEE Transactions on Consumer electronics, 46(2): 313-317, May 2000, XP00110026.
Sajda et al., "In a blink of an eye and a switch of a transistor: Cortically-cuopled computer vision", Journal of Latex Class Files, Jan. 2007, 6(1): 1-14.
Wang et al., "Columbia TAG System—Transductive Annotation by Graph Version 1.0", Columbia University ADVENT Technical Report #225-2008-3, Oct. 15, 2008, entire document.
U.S. Appl. No. 11/846,088, Mar. 7, 2013 Final Office Action.
U.S. Appl. No. 12/548,199, Apr. 22, 2013 Final Office Action.
U.S. Appl. No. 12/874,337, May 22, 2013 Non-Final Office Action.
Belkin, et al., "Manifold Regularization: A Geometric Framework for Learning from Labeled and Unlabeled Examples", *Journal of Machine Learning Research 7*, pp. 2399-2434 (2006).
Ham, et al., "Semisupervised Alignment of Manifolds", *Proceedings of the Annual Conference on Uncertainty in Artificial Intelligence*, Z. Ghahrarnani and R. Cowell, EDS., 10: 8 pages (2005).
Zhu, "Semi-Supervised Learning with Graphs", *Canergie Mellon University*, 164 pages (2005).
U.S. Appl. No. 13/165,553, Jun. 20, 2013 Non-Final Office Action.
U.S. Appl. No. 11/960,424, Jun. 7, 2013 Issue Fee payment.
U.S. Appl. No. 13/935,183, filed Jul. 3, 2013.
U.S. Appl. No. 13/205,044, Oct. 1, 2013 Issue Fee payment.
U.S. Appl. No. 12/548,199, Aug. 21, 2013 Amendment and Request for Continued Examination (RCE).
U.S. Appl. No. 13/165,553, Sep. 10, 2013 Response to Non-Final Office Action.
U.S. Appl. No. 11/846,088, Aug. 8, 2013 Amendment and Request for Continued Examination (RCE).
Huang, et al., "Active Learning for Interactive Multimedia Retrieval", *Proceedings of the IEEE*, 96(4):648-667 (2008).

\* cited by examiner

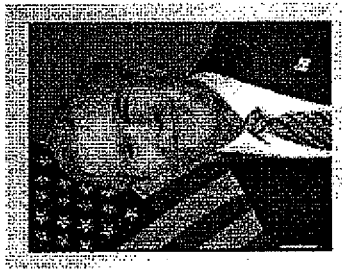
FIG. 3f Insertion
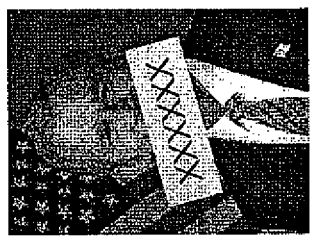
FIG. 3e Overlay
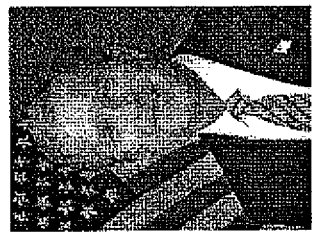
FIG. 3d Grayscale
FIG. 3c Cropping
FIG. 3b Scaling
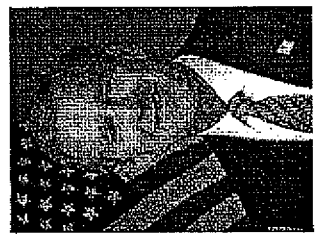
FIG. 3a Original Inconsistent directions from individual manipulations.
(Neither image is parent)

Consistent directions from individual manipulations.
(Left image is parent of right)

All Plausible Edits

Simplified Structure

To Fig.10b

Manually-Constructed History

Automatically-Constructed History

FIG. 14

SYSTEMS AND METHODS FOR IMAGE ARCHAEOLOGY

RELATED APPLICATIONS

This application is a continuation of International Patent Application Serial No. PCT/US08/040,029 filed Apr. 9, 2009, which claims priority to U.S. Provisional Application Ser. No. 61/043,982, filed Apr. 10, 2008. This application hereby incorporates by reference the disclosures of each of the above-listed applications in their entireties and claims priority therefrom.

GRANT INFORMATION

This disclosed subject matter was made with government support under Grant No. 0716203 awarded by the National Science Foundation. The government has certain rights in the disclosed subject matter.

BACKGROUND

In modern society, artifacts are created and archived at an increasingly growing rate. Specifically, the proliferation of the Internet and the continued growth and simplification of web publishing tools has greatly facilitated sharing and publication of ideas and stories online by technologically unsophisticated users. These stories and ideas are frequently enhanced by the inclusion of photographs and images which support the viewpoints and messages of the authors. In many cases, through the use of photo editing software, the images can become highly manipulated, with portions added, removed, or otherwise altered. These manipulations often not only indicate the usage of the images, but also affect the meanings conveyed by the images and reflect the beliefs of the authors. A history of the manipulations over an image can be revealing of the evolution in temperament, viewpoint, and attitudes of the general public over time.

FIG. 16a shows a famous photograph, Raising the Flag on Iwo Jima, which was taken by Joe Rosenthal shortly after the World War II battle in Iwo Jima in 1945. Immediately after it was shot, the image was reproduced in newspapers all across the United States. The wide distribution of the image served to invoke national pride and convey a highly patriotic and supportive view of the United States' use of military force. In FIG. 16b, a photomontage made for an anti-Vietnam War poster in 1969 by Ronald and Karen Bowen, replaced the flag in the soldiers' hands with a giant flower. The objective here was to take the originally pro-war image and subvert its meaning into anti-war imagery.

The challenge of identifying whether or not two images are copies of each other has been addressed in recent research efforts in image near-duplicate detection. As the term "near" would imply, these research efforts aim to detect pairs where the duplication may not be exact. Thus the methods of copy identification are robust against a variety of distortions, such as cropping, scale, and overlay. However, these detection methods do not specifically address the manipulations that one image has been subjected to arrive at the other images.

Another field, image forensics, also takes into account of the manipulation for identifying whether or not any manipulations of an image have taken place. Approaches in this field can involve checking the consistency of various regions of the image for artifacts induced by the physics or the peculiarities of the acquisition and compression processes. Such cues can be used to identify the camera used to take a photograph or if two regions of a photograph are derived from separate sources. However, again, image forensics focus on the evaluation of similarities between two images, and are not concerned with detecting the manipulations of images in the context of a plurality of various instances of the same image.

It would be valuable to identify the original image in a collection of related images, and desirable to track the usage of the images and their evolution over time, and to help design systems that enhance image searching, browsing, and retrieval using information obtained from such archaeological digs. Therefore, there is a need for developing techniques for analyzing related images and determining plausible manipulation history among the images.

SUMMARY

Systems and methods for determining the manipulation history among a plurality of images are herein described.

In some embodiments of the described subject matter, the described techniques include selecting a first image and a second image from the plurality of images and detecting one or more manipulations that are operable to transform one of the images to the other. Further, based on the one or more manipulations detected, a parent-child relationship between the first image and the second image can be determined. The determined parent-child relationship can then be presented in a user readable format.

In certain embodiments, the described techniques further include repeating the procedure of selecting two images, detecting manipulations, and determining the parent-child relationship on each pairs of images in the plurality of images, constructing a visual migration map for the images, and presenting the visual migration map in a user readable format.

In certain embodiments, the described techniques include obtaining the plurality of images by manual collection, using an Internet search engine, or web-crawling.

In particular embodiments, the described techniques include using a copy detection technique to sort the plurality of images into subsets of images and selecting a pair or pairs of images in the subset of images for further detection of manipulations and determination of parent-child relationship(s).

In certain embodiments, the described techniques include using one or more context-independent detectors and then one or more context-dependent detectors. The context-independent detectors can include a scaling detector and a gray-scale detector. The context-dependent detectors can include a cropping detector, an insertion detector, and an overlay detector.

The described techniques can be implemented in a system, e.g., a computer apparatus, which includes one or more input devices, one or more processing devices, one or more memory devices, and one or more display devices.

BRIEF DESCRIPTION OF THE DRAWINGS

For a more complete understanding of various embodiments of the described subject matter and its advantages, reference is now made to the following description, taken in conjunction with the accompanying drawings, in which:

FIGS. 3a-3f illustrate an original image and the outcomes of some manipulations on an original image.

FIG. 14 illustrates correlations between image types and their associated perspectives according to some embodiments of the described techniques.

DETAILED DESCRIPTION

The described techniques herein include computer-implemented methods for determining the parent-child relationship between a pair of images in the context of a plurality of images, as well as determining the parent-child relationship among all the images in the plurality of images.

Figure 1:
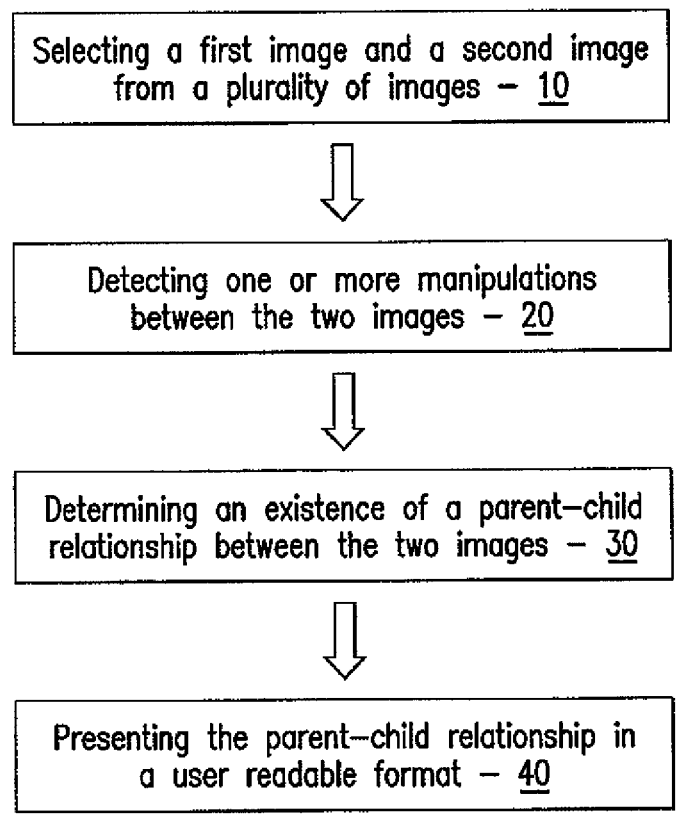
FIG. 1 is a process diagram in accordance with an embodiment of the disclosed subject matter.

In one embodiment, the described techniques provide a method for determining manipulation history among a plurality of images. Referring to FIG. 1, the method includes selecting a first image and a second image from the plurality of images at 10, detecting one or more manipulations operable to transform one of the selected images to the other image at 20, determining existence of a parent-child relationship based on the detection of the manipulations at 30, and presenting the parent-child relationship determined in a user readable format at 40. The described techniques are hereinafter also referred to as "Image Archaeology Techniques."

The Image Archaeology Techniques are based on the observation that many manipulation operations performed on images are directional: they either remove information from the image or inject external information into the image. Therefore, there are clues about the parent-child relationship between images encoded in the image content. Determining the parent-child relationship can be broken down into the task of individually detecting each type of manipulation and its directionality. The directions of manipulations are then checked to see if they are in agreement or not. As will be shown below, the directionality of many types of editing operations can be detected automatically, and plausible visual migration maps (VMMs) can be constructed for the images. As used herein, VMMs are a collection of images or tokens thereof that identify the images, together with indications of parent-child relationship among the images in the collection.

The observable manipulations on images available on the internet do not exist in a vacuum. Instead, many images have a history and context that change over time. It is not the typical case that users are exposed initially to an original version of the image and decide to derive an image directly from the original. Rather, users can be exposed to a particular version of the image that is already derivative in some respect. For example, the image can be cropped, scaled, or modified with overlays with respect to the true original image. There is often also text surrounding the image, which conveys a story and shapes a user's interpretation of the image. Therefore, each image is likely the result of many generations of manipulations and changes in meaning and context.

Figure 2:
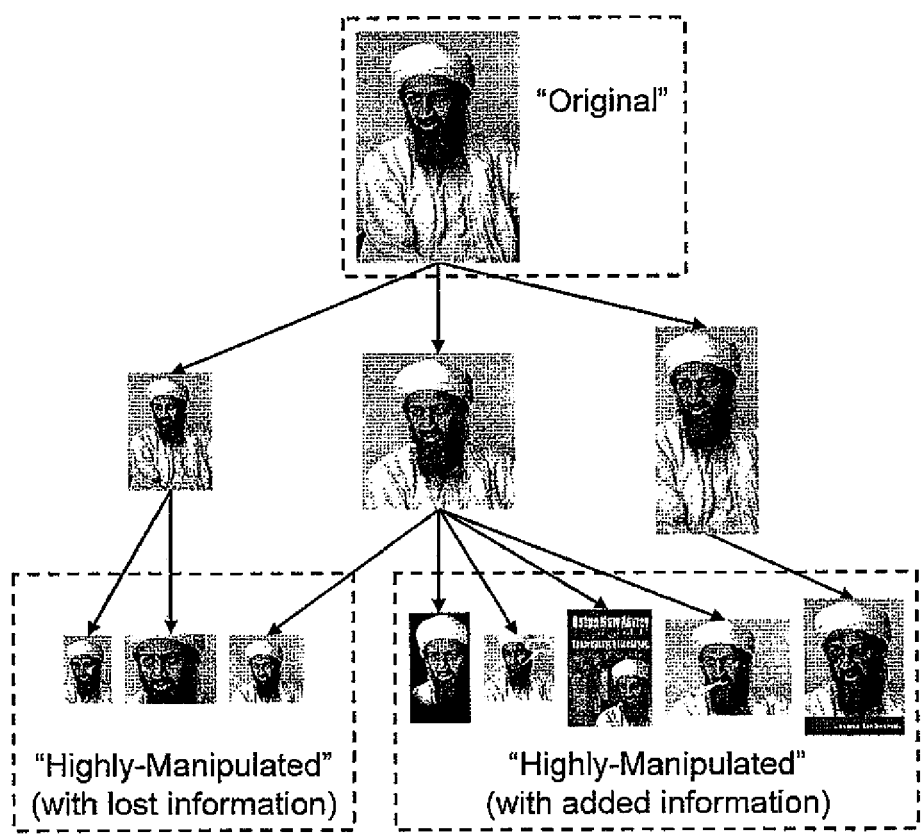
FIG. 2 depicts a hypothetical visual migration map (VMM) showing the manipulation history of an image.

In FIG. 2, a hypothetical VMM of an image is illustrated. The original image is shown at the top, and its children are shown as images through various manipulations. The children can be further manipulated to form their own children. This VMM can have a number of characteristics that can be helpful for image exploration or searching, including, for example, the "original" and "highly-manipulated" images as shown in FIG. 2.

Original versions of images are typically of high resolution, contain the largest crop area, and are subject to the least manipulations. These versions can be the most relevant for certain image searching tasks. Highly-manipulated images are the ones that are many generations away from the original. On one hand, there are images which are highly-manipulated in terms of simply having information removed, through excessive cropping and down-scaling, which usually do not to enhance or change the meaning conveyed in the original version. On the other hand, there are images which are highly-manipulated in the sense that they have a great deal of external information overlaid on top of the original image. These can be of more interest to the user, since the meanings of the images may have been significantly altered.

The presently described techniques can automatically identify the points along the evolution of the image which can be of particular value to a viewer or a searcher. It is noted that without explicit information from image authors, it can be difficult to obtain a true history of image manipulations. Also, it is often impossible to obtain every single copy of an image in the world. However, by using limited number of certain images collected from available sources, the described techniques can yield important insights as to the evolution of an image over time, and reveal many important characteristics necessary for building search and browsing applications, including identifying the "original" and "highly-manipulated" images.

The plurality of images can be obtained from a number of sources. For example, the images can be collected manually, by using an internet search engine, or through a program such as a robot designed to crawl and download images from the internet.

After the plurality of images are obtained, they can be further sorted into subsets of "connected images," since some of the techniques for obtaining the images can yield images that are not actually related. For example, an Internet search of a person's name through GOOGLE® IMAGES® search engine can yield photographs of many people having the same name. As used herein, a subset of "connected images"

refer to a group of images that are likely derived from a common "ancestor" image through distinct manipulations.

This sorting of images can be accomplished by various copy detection techniques known to those skilled in the art. For example, the techniques described in Hampapur et al. "Comparison of sequence matching techniques for video copy detection," Conference on Storage and Retrieval for Media Databases, pages 194-201 (2002) and Zhang et al. "Detecting image near-duplicate by stochastic attributed relational graph matching with learning," In ACM Multimedia (2004), the contents of which are incorporated by reference herein, can be used.

An exemplary copy detection technique can be implemented as follows. First, scale invariant feature transform (SIFT) descriptors can be extracted for each image. These features capture local geometric properties around interest points within the image. SIFT descriptors are invariant against a number of distortions, such as scaling and rotation, and robust against a number of other transformations. They are highly distinctive and occurrences of descriptors of a real-world point represented across different images can be matched with high precision. Each image has a set of SIFT descriptors, $I_S$, where each descriptor is a tuple of $(x_i, y_i, f)$, where $x_i$ and $y_i$ are the spatial X-Y coordinates of the interest point in the image, and f is an 128-dimensional SIFT feature vector describing the local geometric appearance surrounding the interest point. Given two images, A and B, all pairwise point matches are searched between the images. A matching set are detected when the Euclidean distance between the points' features, $D(f_{A,i}; f_{B,j})$, falls below a predetermined threshold. Matching points between A and B are then retained in a set, $M_{A,B}$, which consists of a set of tuples, $(x_{A,i}, y_{A,i}, x_{B,j}, x_{B,j})$, marking the locations of the matching points in each image. Then a predetermined threshold is applied on the number of matching points, $M_{A,B}$, in order to get a binary copy detection result. The threshold can be determined depending on the sensitivity desired. In some embodiments, a threshold of 10-100 can be used. In one embodiment, the threshold is selected as 50.

For two images selected from the plurality of images (or in a subset thereof containing connected images), a determination can be made as to whether one of them has been derived from the other. This can be done by detecting the existence of one or more manipulations between the two images.

"Manipulation" as used herein refers to a distinct image-altering operation, alone or in combination with one or more other operations, which is operable to transform one of the two images to the other. For example, a manipulation can be an operation performed on an image to alter its size, orientation, color, content, as well as an operation that uses the image or a derived image thereof as a subpart of another image. A manipulation can be selected from the various image-altering operations such as scaling, rotation, cropping, resizing, blurring, mirroring, color adjustment, contrast adjustment, mirroring, and other various filtering operations that are provided by commercial graphics software, e.g., ADOBE PHOTOSHOP®. A manipulation can also include converting an image into a different format wherein artifacts can be introduced as a result of the conversion. For example, when an uncompressed TIFF image is converted to a JPEG image, the compression methods employed by JPEG can result in artifacts not present in the original TIFF image.

A manipulation can include several sub-procedures: for example, a smaller image can be derived by successive cropping of a larger image. However, these sub-procedures are herein considered herein as one overall operation. For efficiency purpose, the detection of manipulations can be preferably performed within subsets of connected images, because if the two images are not in the same subset of connected images, no manipulations would be detected.

Among the wide variety of manipulations, those manipulations implying a directional relationship between the two images are of special interest. For example:

Scaling is the creation of a smaller, lower-resolution version of the image by decimating the larger image. In general, the smaller-scale image can be assumed to be derived from the larger-scale image.

Cropping is the creation of a new image out of a subsection of the original image. The image with the smaller crop area can be assumed to have been derived from the image with the larger crop area.

Grayscale is the removal of color from an image. The grayscale images can be assumed to be derived from color images.

Overlay is the addition of text information or some segment of an external image on top of the original image. The image containing the overlay can be assumed to be derived from an image where the overlay is absent.

Insertion is the process of inserting the image inside of another image. For example, an image can be created with two distinct images placed side by side or by inserting the image in some border with additional external information. It can be assumed that the image resulting from the insertion is derived from the other image.

Note that the above list is not exhaustive. They are used only as examples that can potentially change the meaning of the image, rather than just the perceptual quality. FIGS. 3b-3f illustrates the results of these manipulations, i.e., scaling, cropping, grayscale, overlay, and insertion, respectively, as applied to an original image FIG. 3a.

There can be exceptions in the directions of each of these manipulations. It is possible, though very atypical, to scale images up, or remove an overlay with retouching software.

Detecting manipulations can be done directly between two selected images alone when the manipulations themselves clearly indicate directions, i.e., which image might have been subjected to the manipulations, and which image is likely the resulting image of the manipulations performed on the other image. However, for certain types of manipulations, the precise directionality cannot be detected with confidence from the selected pair of images alone. Comparing FIGS. 3a and 3e, a person can tell that FIG. 3e contains an overlay. A machine, however, would only be able to discern that the two images differ in the region of the overlay, but would not necessarily be able to infer which image contains the original content and which one contains the overlay. By considering all of the images in FIG. 3, however, the presently described techniques can determine that most images have content similar to FIG. 3a in the region of the overlay, and thus determine that FIG. 3e should be the result of an overlay manipulation performed on FIG. 3a.

As used herein, a technique for detecting a particular manipulation between a pair of images is referred to as the "detector" for such a manipulation. For example, a technique for detecting a scaling manipulation is referred to as a "scaling detector." The term "context-independent detector" (or "context-free detector") includes a detector wherein the directionality of the manipulations can be determined solely based on the two selected images. Context-independent detectors can include, but are not limited to, a grayscale detector and a scaling detector. The term "context-dependent detector," on the other hand, includes a detector wherein manipulations can be detected, whereas the directionality of the manipulations cannot be unambiguously determined solely based on the two selected images. However, the directionality of these manipulations can be determined in the context of the plurality of images from which the two images are selected. Context-dependent detectors can include, but are not limited to, a cropping detector, an insertion detector, and an overlay detector.

If the plurality of images have not been sorted into subsets of connected images, detecting manipulations between any two images in the plurality of image can start with using a copy detection technique as described above to determine whether the two images belong to the a subset of connected images. This procedure is referred to herein as a "copy detector," although it is understood that this "detector" itself does not give cues regarding specific manipulations or their directions. If the two images are determined by a copy detector as not belonging to the same subset of connected images, it is not necessary to detect manipulations using other detectors (i.e., it can be simply determined that no manipulations exist between the two images); otherwise, other detectors can then be used to further ascertain what specific manipulations exist between the two images. Therefore, it is preferable that the detection of manipulations includes a copy detector in conjunction with other detectors.

According to certain embodiments of the described subject matter, detecting one or more manipulations between the two selected images can include using one or more context-independent detectors. In one embodiment, the context-independent detector can be a scaling detector. In one embodiment, the scaling detector can be implemented by first employing a copy detection technique as the one described above to generate a set of matching points, $M_{A,B}$. Assuming no image rotation is involved, the scaling factor between the two images, $SF_{A,B}$, can be estimated directly as the ratio between the spatial ranges of the X-Y locations of the matching points:

$$SF_{A,B} = \frac{\max(x_A) - \min(x_A)}{\max(x_B) - \min(x_B)} \quad (1)$$

The same estimate can be computed for the Y-dimension to account for disproportionate scaling. A predetermined threshold can be applied to $SF_{A,B}$ for a binary detection of scaling. The directionality of the scaling manipulation, if any, is from the larger image to the smaller image.

Another approach for scaling detection can be a random sample consensus approach, for example, as described in M. Fischler et al. "Random sample consensus: a paradigm for model fitting with applications to image analysis and automated cartography," Communications of the ACM, 24(6): 381-395 (1981). The random sample consensus approach has been frequently used for image registration in computer vision and remote sensing.

The above estimation in the scaling detector can also be used to normalize the scales and align the positions of the two images. For example, a normalized image B, image B', can be obtained by scaling image B by a factor of $SF_{A,B}$ while interpolating pixels of image B by a factor of $SF_{A,B}$. In addition, simple shift operations can be performed to align the interest points (and corresponding pixel content) of B' with A. Such scale normalization and position alignment can be later used to conduct pixel-level comparisons to detect the existence of other manipulations between the two images.

In another embodiment, the context-independent detector can be a grayscale detector (or color removal detector). The grayscale detector can start with estimating whether each image is in grayscale. For example, an image can be readily determined to be grayscale when it is stored as a grayscale file containing a single channel. There are also grayscale images that are stored in regular three-channel files, which include, but are not limited to, RGB and YUV files. For these cases, the grayscale detector can utilize the differences between values of each pixel for the different channels, for example, the red, green, and blue channels in a RGB file. When the differences are very small (i.e., below a predetermined threshold), the image can be determined to be grayscale. Otherwise, the image can be determined to be in color. Once it is determined whether each of the two images is in color or in grayscale, the existence of a grayscale manipulation between the two images can be determined. The directionality of the grayscale manipulation, if any, is from the color image to the grayscale image. If the two selected images are not previously determined to be in the same subset of connected images using a copy detection technique, the grayscale detector can be preferably used in conjunction with a copy detector. In this case, if the copy detector determines that the two images are not in the same subset of connected images, regardless of a detection of grayscale manipulation, no manipulations are considered existent between the two images.

According to some embodiments of the described subject matter, detecting one or more manipulations between the two selected images can include using one or more context-dependent detectors. As noted above, some manipulations such as cropping, insertion, or overlay, cannot be detected with confidence under certain circumstances by looking at the differences between the two selected images alone. To address this problem, all of other copies of the image in the same group of connected images can be employed, in the following procedure.

Any image $I_A$ has a set of "neighbors," $II_{A,N}$, which are the images that have been detected as copies of $I_A$. These neighbors are also all the images in the group of the connected images to which $I_A$ belongs with the exception of $I_A$ itself. Within this set, a method can then be used to normalize the scales and offsets between each image in $II_{A,N}$ and $I_A$, yielding a scaled-shifted version of all the images in $II_{A,N}$, collectively referred to as $II_{A,N''}$, such that all of the images in $II_{A,N''}$ can be composited on top of each other (as well as on top of $I_A$) with pixel-wise correspondences. An example of such a method can be the method described above in connection with the scaling detector.

A composite image of image $I_A$, $I_{A,\,comp}$, can then be obtained as:

$$I_{A,comp} = \frac{\sum II_{A,N''}}{|II_{A,N}|} \quad (2)$$

where $|II_{A,N}|$ represents the number of images in the set $II_{A,N}$, and $\Sigma II_{A,N''}$ represents the sum of the values (e.g., grayscale intensities) of the corresponding pixels in each of the scaled-shifted images in the set $II_{A,N''}$. Therefore, $I_{A,comp}$ is essentially the average of the corresponding pixels in the images in the neighbor set $I_{A,N}$. This composite image reflects the contextual information about the typical appearances of areas of the image across many different copies of the image. Then, the content of $I_A$ is compared against the composite content in $I_{A,comp}$ to find regions of $I_A$ that are atypical. This can be done through the residue between the two:

$$I_{A,res} = |I_A - I_{A,comp}| \quad (3)$$

where the residue image $I_{A,res}$ contains pixels that are the absolute values of the differences between the corresponding pixels of the image $I_A$ and its composite image. A predetermined threshold can be applied to $I_{A,res}$ to binarize it (e.g., to zero and a non-zero number, or black and white). Thereafter, detecting one or more manipulations between the two images, $I_A$ and $I_B$, can be done by comparing their respective residue images $I_{A,res}$ and $I_{B,res}$ as proxies.

FIG. 4 illustrates the appearances of the composite and residue images. The composite images can still show traces of manipulations that are present in other images, but are largely true to the original content of the image. In the resulting residue images, areas that are consistent with the original image will be black (indicating a pixel-wise difference between the image and its composite is below the predetermined threshold), and areas that are inconsistent will be white (indicating that a pixel-wise difference between the image and its composite is above the predetermined threshold). These residue images can be used to disambiguate the directions of overlay manipulations or to clarify the differences between crops and insertions as follows.

Figure 4A:
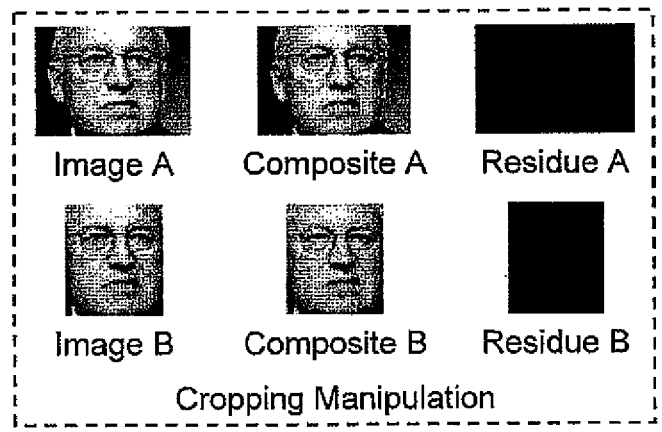
FIGS. 4a-4c illustrate the appearances of the composite and residue images of certain original images, the composite and residue images being obtained according to some embodiments of the described techniques.
Figure 4B:
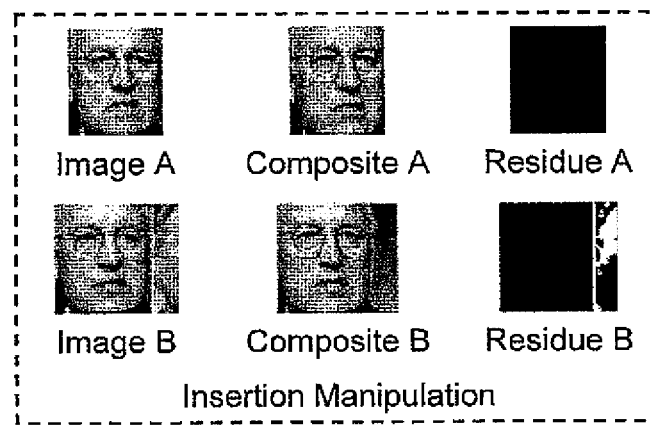

FIG. 4a shows an example of how a crop manipulation can manifest in the composite and residue images of an image. The image content in the larger-crop-area image (Image A) largely match its composite image (Composite A), which is reflected in the darkness of its residue image (Residue A). This is consistent with a cropping manipulation. FIG. 4b, on the other hand, shows an example of an insertion manipulation (Image A). Here, the content of larger-crop-area image (Image B) is different from its composite image (Composite B), which is reflected in the many white areas of its residue image, also referred to as the noise patterns (Residue B). This is consistent with an insertion manipulation. In summary, cropping and insertion can be discovered by finding image pairs with differences in image area, and then be disambiguated by examining the properties of the residue image with the larger crop area in the region outside the shared image area of the two images. As used herein, "image area" refers to a measure of the actual content of an image regardless of its actual size or resolution. For example, if an image B is obtained by proportionally downscaling an image A to half of its original size, image B and image A would have the same image area.

Figure 4C:
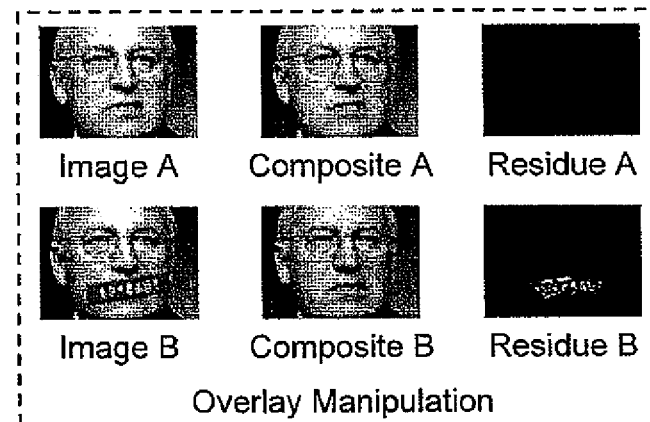

FIG. 4c shows an example of the composite and residue images associated with an overlay manipulation. The overlay image has a region that is highly different from the original, which is reflected in white pixels in the residue image. It is noted that although both overlay and insertion manipulations exhibit regions of an image with high dissimilarity to its composite image, the area of difference for overlay is inside the image area shared by both images, while areas of differences are outside the image area shared by both images in the case of insertion.

In some embodiments, detecting one or more manipulations between two selected images include first using one or more context-independent detectors and then one or more context-dependent detectors. Using one or more context-independent detectors can further include obtaining the composite image of each of the two images, obtaining a residue image for each of the two images based on differences between each of the two images and its corresponding composite image, and then determining the one or more manipulations operable to transform one of the two images to the other. If the two images have different image areas after normalization and alignment, insertion or cropping manipulations can be detected based on the noise patterns of the non-overlapping region of the respective residue images. If the two images have the same image area or an overlapping image area wherein a noise pattern occurs in one of the residue images, an overlay manipulation is detected.

Figure 5:
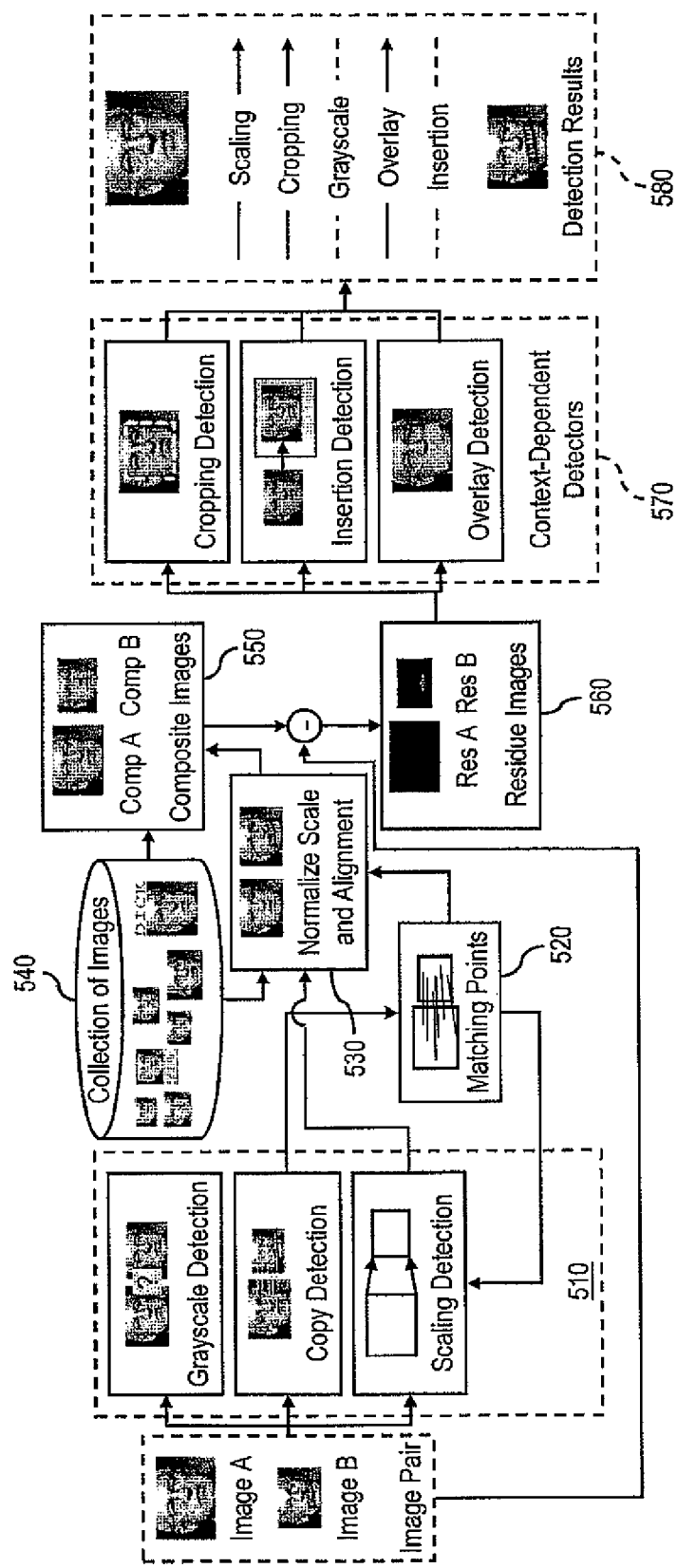
FIG. 5 depicts a schematic diagram for detecting manipulations between two selected images from a plurality of images according to some embodiments of the described techniques.

FIG. 5 is an illustrative diagram for one of such embodiments. Image A and Image B are first subjected to copy, grayscale, and scaling detection at 510. The copy detection can generate a number of matching points between image A and image B at 520, which can be further used in the scaling detection. The scaling detection and the matching points can be further used to scale and align image A and B at 530, which shows a scaled-shifted Image A and the original Image B. Based on a collection of a set of connected images 540, the composite image of Image A (Comp A) can be obtained at 550 using the scaling/alignment techniques above as applied to each of the images in 540 as well as Image B followed by averaging the scaled and shifted images according to Equation 2, above. The composite image of Image B (Comp B) can be obtained at 550 in a similar manner using the collection of images in 540 and Image A. The difference between Image A and its corresponding composite image is obtained as the residue image of Image A (Res A) at 560. The residue image of Image B (Res B) can be obtained as the difference of Image B and Comp B at 560. Based on these two residue images, cropping, insertion, and overlay manipulations can be detected at 570. The detection results at 580 show that between Image A and Image B, scaling, cropping, and overlay manipulations are detected to be existent, all of which being of the same directionality. Grayscale and insertion manipulations are not detected.

After the detection of manipulations between the two images, a parent-child relationship can be determined to be existent or non-existent. If there is no manipulation detected, there would exist no parent-child relationship between the two images. Otherwise, there are several possible scenarios. First, if only one manipulation is detected to be existent, which is operable to transform one image to the other image, then a parent-child relationship is determined to be existent, the parent being identified as the former image. Second, if multiple manipulations are detected to be existent and each of which is operable to transform one image to the other image, then a parent-child relationship is determined to be existent, the parent being identified as the former image. Third, if multiple manipulations are detected to be existent but are of different directionality, i.e., at least one of the detected manipulations is operable to transform the first image to the second image, while at least another of the detected manipulations is operable to transform the second image to the first image, then a parent-child relationship is determined to be non-existent. Note that this last scenario only indicates that the two images are not of "linear kinship." They can both still be part of an "extended family" with a common ancestor. It is also noted that a parent-child relationship does not require that one image is the immediate source from which the other is derived. There could be intermediate generations of copies between the two images.

Figure 6A:
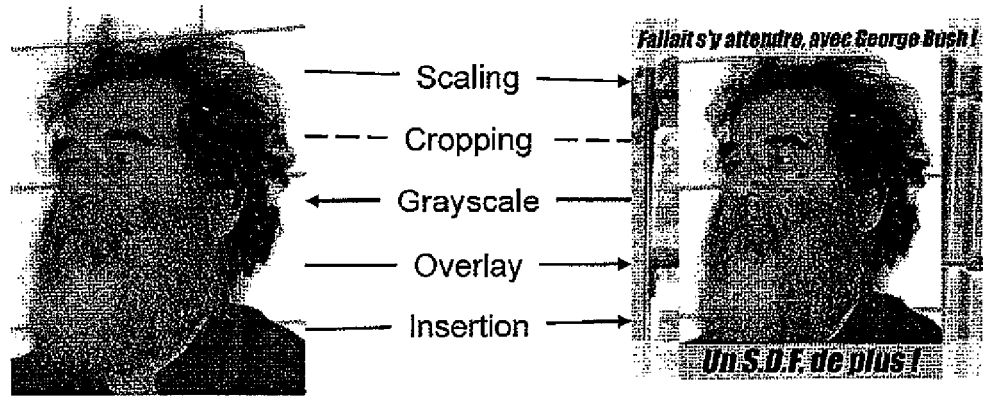
FIGS. 6a and 6b depict examples of multiple manipulations between two images that are of consistent and conflicting directionalities.

FIG. 6 depicts some examples of how the detected manipulations can demonstrate conflicting directionality. At the top, in FIG. 6a, the detectors are giving conflicting stories. The scaling, overlay, and insertion detectors indicate that the right image is the child, while the grayscale detector suggests just the opposite. There appears to have been no cropping. The contradictory stories being told by the manipulation detectors indicates that neither of the images is derived from the other. It is likely that each is derived from another image, and the two can be cousins or siblings in the manipulation history.

Figure 6B:
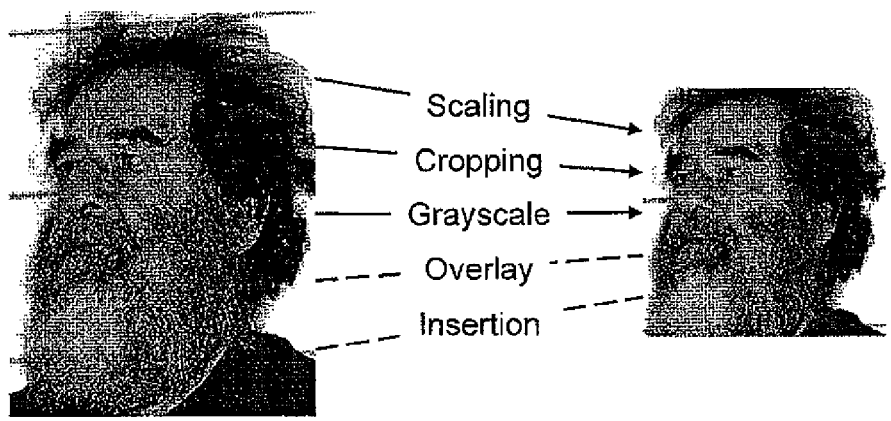

FIG. 6b shows a situation where the individual manipulations are in agreement with respect to directionality. The scaling, grayscale, and cropping detectors all indicate that the right image is derived from the left one, while no insertion or overlay effects appear to be existent. The cumulative effect of all of these detections is that the left image is the parent of the right one.

The determined parent-child relationship, if any, can then be presented in any user readable format. For example, it can be presented as a directed graph format wherein the two images are represented as nodes and the relationship is represented by an arrow pointing away from the parent image and to the child image. It can also be presented as simple text stating the images involved and the parent-relationship found. Any additional information associated with the image can also be presented. The presentation can be made on a monitor, printed on paper, or on other electronic or physical display means.

In the above, only two images are compared and manipulations between them are detected, although sometimes the information about the rest of the plurality of images obtained can be utilized when the number of the plurality of images is greater than 2. The procedure of detecting manipulations and determining parent-child relationship can be repeated for all other pairs of images in the plurality of images to determine a parent-child relationship between them. Then, a VMM for the plurality of the images can be constructed, wherein the images can be represented as nodes and the parent-child relationship can be represented as directed edges between nodes.

Any other suitable user readable formats can also be used as long as they can sufficiently identify each of the images and the parent-child relationship among them. The user readable format can include, but are not limited to, a table tabulating the images or their identifiers with their parents' and/or children's images or identifiers, a matrix showing the images or their identifiers and the relationship between the images, a text description of each of the images and its parents/children. Any additional information associated with the image can also be presented, for example, the source where the image is obtained and the text surrounding the image in the source.

Depending upon the nature of the pool of the obtained plurality of images used to conduct this manipulation history detection, the VMM(s) derived can be different. If the pool is heterogeneous, for example, when the images are drawn from web image search results, then several different connected components of different (non-copied) images can be found within the pool. If the pool is rather homogeneous, for example, when a set of known copies are obtained by manual collection, then a single set of connected images can be covering all of the images. In any event, for efficiency purpose, either an apparent heterogeneous or an apparent homogeneous pool of images can be first subjected to a copy detection technique as described above to sort the images into subsets of connected images, and then the pairwise image comparisons can be conducted within each subset of connected images to determine the manipulations and parent-child relationships. In the end, a VMM for each of the subsets of connected images is obtained. The VMM(s) can then be presented in a user readable format.

Figure 7A:
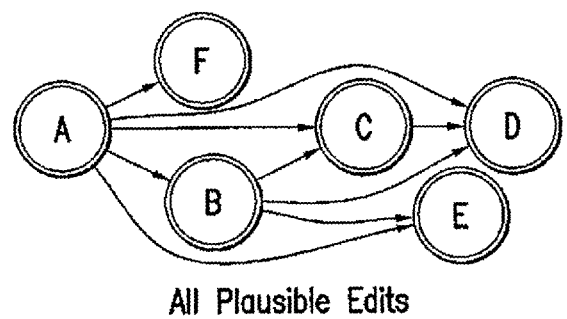
FIGS. 7a and 7b depict an example of simplifying the structure of a VMM according to some embodiments of the described techniques.
Figure 7B:
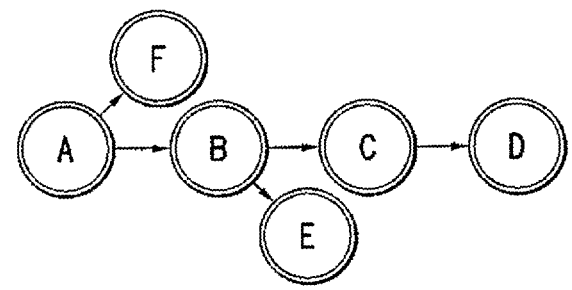

There can be redundancy in the graph structure of each VMM. For example, the above described procedures can result in a VMM having a structure shown in FIG. 7a, because it is plausible for an image to have been derived from its parent or its parent's parent, thereby resulting in the detection of a parent-child relationship between the image and each of its linear ancestors. The graph structure can be simplified by retaining only the longest descendent path between two images, resulting in a VMM having a structure shown in FIG. 7b, wherein each node has at most one parent node. This is not necessarily better than any other graph simplification, but it is practical in that it retains important aspects, such as the sink nodes (the nodes that have no outgoing edges) and source nodes (the nodes that have no incoming edges), and assumes that each image inherits the manipulation history of its parents.

Figure 15:
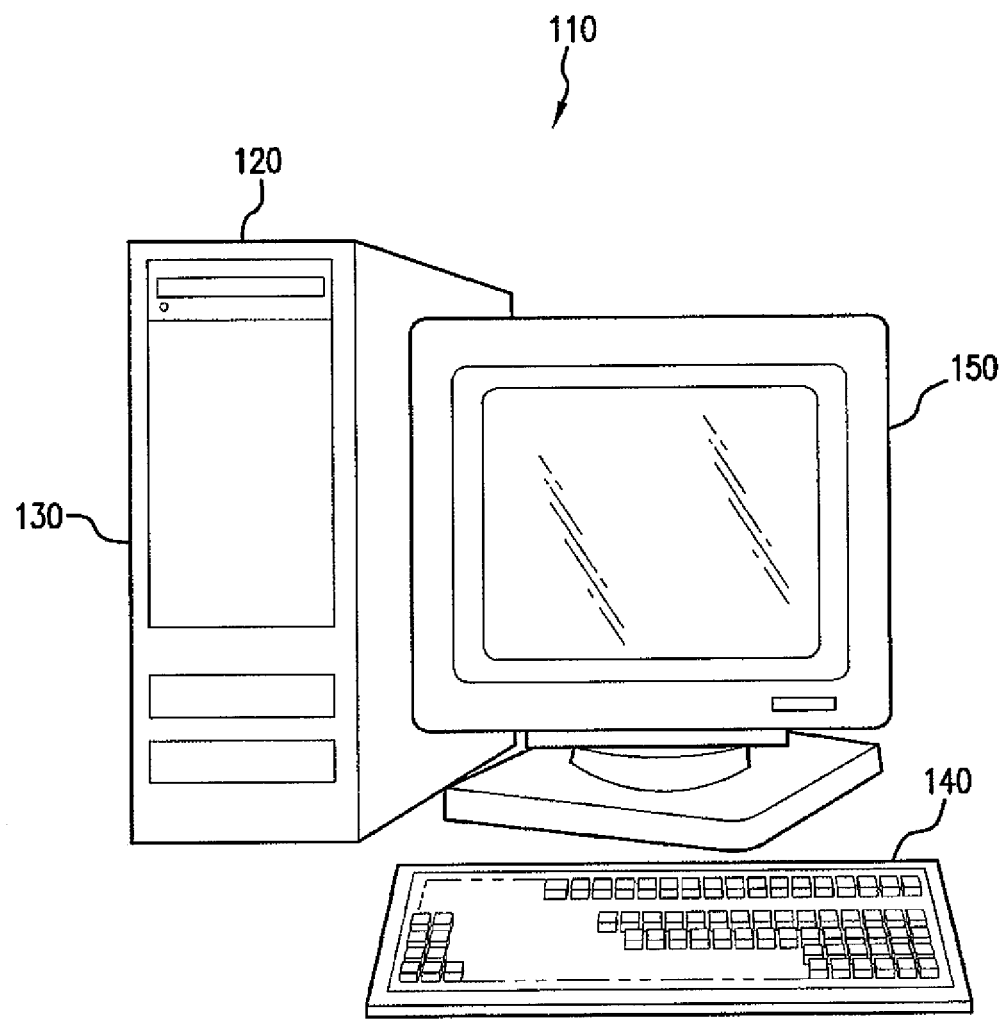
FIG. 15 illustrates a system in accordance with an embodiment of the disclosed subject matter.
Figure 16A:
FIGS. 16a and 16b are two images illustrative of the change of meaning of an image over time.
Figure 16B:

The techniques of the described subject matter can be implemented on a computer apparatus, special purpose hardware, or computers in a client/server environment that includes one or more processors, memory, input devices, output devices, display devices, communication devices and networks, and data storage devices, for example, computer readable media, using software or firmware programmed to implement the techniques. FIG. 15 depicts a diagram for an exemplary system for implementing the described techniques. The system includes a computer 110, with a memory 120, processor 130, data entry device 140, and display device 150. The computer can include a IBM-PC compatible computer, or any other portable devices having one or more memory devices, processing devices, and input and output devices. Memory 120 can be a hard drive, but can be any other form of accessible data storage, while processor 130 may be any type of processors. Data entry device 140 is a keyboard, but may also include other data entry devices such as a mouse, an optical character reader, or an internet connection for receiving electronic media. Display device 150 can be a monitor, but can also be any other types of devices sufficient to display information in text, graphs or other user readable formats. Those of ordinary skill in the art will appreciate that the described techniques can be practiced by any of numerous variations of the above described embodiment.

In some embodiments, instructions embodying the described techniques can be included in a computer readable medium, such as a DVD, CD, hard disk, nonvolatile memory, computer chip, or the like. The computer apparatus can include the computer readable medium. The computer apparatus can further include processors in communication with the computer readable medium to receive the instructions embodied thereon. The processors can be in communication with one or more memories for storing and/or accessing data for the techniques. The data can include one or more of the images or other data of the described techniques. The computer apparatus can also include multiple processors, processing the described techniques in parallel or processing the described techniques in a separable manner such that a first one or more processors can process a first portion of the techniques while a second one or more processors processes a second portion of the techniques. Before presenting the results obtained by the described techniques in a user readable format, the results can be stored in a memory, such as a database, as appropriate; also, the results can be delivered over one or more networks to the other entity for presentation.

In one embodiment, a system for determining manipulation history among a plurality of images include: an input device for receiving a first image and a second image from the plurality of images; a processing device that is operably coupled with the data input device for detecting one or more manipulations, if any, that are operable to transform the first image to the second image or the second image to the first image; a processing device (either the same with the processing device above, or another processing device operably coupled with the above processing device) for determining an existence of a parent-child relationship between the first image and the second image based on the detection of one of more manipulations, if any; and a display device, operably coupled with the latter processing device, for presenting the determined parent-child relationship, if any, in a user readable format. As used herein, "operably coupled" refers to a state of two devices being connected through a means of communication that allows data to be received, sent, and/or exchanged between the two devices, the data including instructions to be executed and/or data processed or to be processed. For example, a processing device can be operably coupled with the displaying device through one or more memory devices.

In one embodiment, a system for determining image manipulation history include: an input device for receiving at least a first image and a second image; one or more processing devices, at least one of which being operably coupled with the data input device, for detecting one or more manipulations, if any, that are operable to transform the first image to the second image or the second image to the first image, for determining an existence of a parent-child relationship between the first image and the second image based on the detection of one of more manipulations, if any, and for constructing a visual migration map based on the detection of one or more manipulations for each pair of images in the plurality of images; and a display device, operably coupled with one or more of the processing devices, for presenting the visual migration map in a user readable format.

EXAMPLE

The following Example merely illustrates certain aspects of certain embodiments of the disclosed subject matter. The scope of the disclosed subject matter is in no way limited by the embodiments exemplified herein.

Figure 8:
FIG. 8 depicts some images used in Example 1 of the present application which were evaluated according to some embodiments of the described techniques.

In this example, images to be processed were collected from the internet by querying the web with a set of queries culled from a variety of sources. Among these sources are the queries in the Google image search Zeitgeist, which lists popular queries entered into the engine in recent history, and the query topics for named persons used over the past years in the TRECVID video search evaluation from the National Institute of Standards. A list of approximately 100 image search queries were collected, spanning a range of categories including named persons (such as politicians, public figures, and celebrities), locations (such as specific cities and tourist destinations), events in the news, films, and artists. From these queries, a set of keywords were manually generated which were expected to return relevant photographs from a web image search. These keywords were then entered into the Yahoo!® web image search engine and the top-1000 returned images (the maximum number available) were obtained. A copy detection technique was first applied to these images to sort them into subsets of connected images. The subsets of connected images were then filtered by visually skimming the contents of the subsets of connected images to find those subsets which contained interesting manipulation patterns. In the end, 22 unique queries were evaluated, a representative image of each query being shown in FIG. 8.

Figure 9:
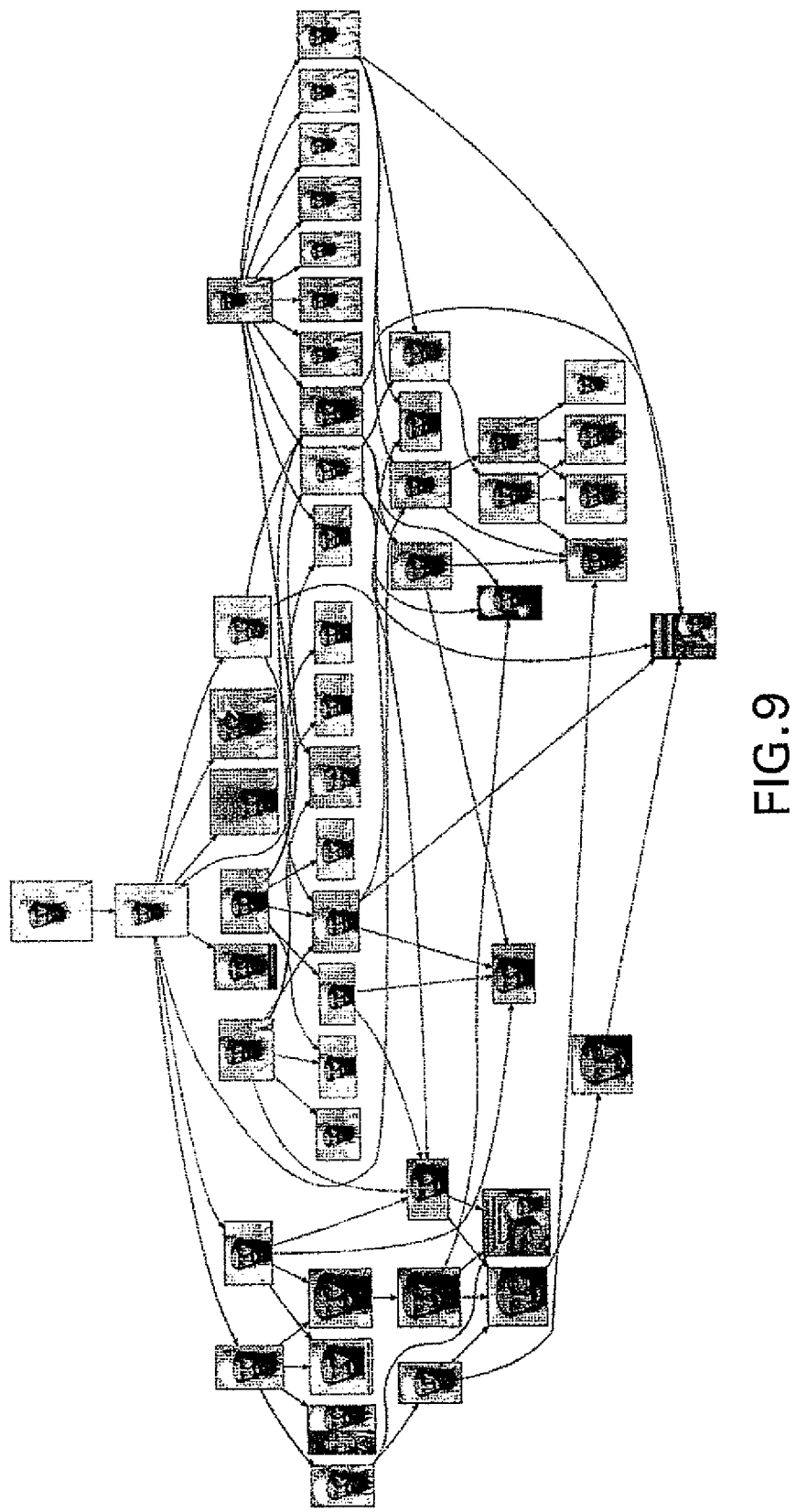
FIG. 9 depicts a VMM obtained according to some embodiments of the described techniques for a photograph of Osama bin Laden.
Figure 10A:
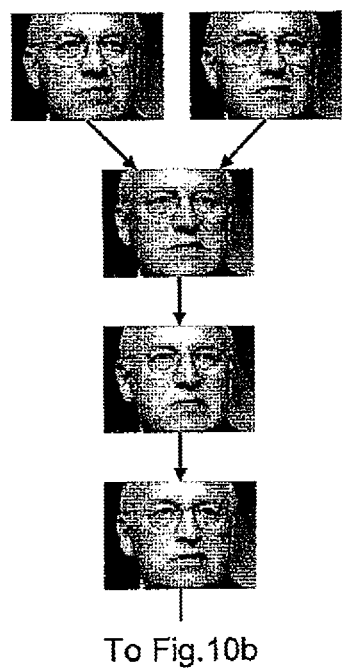
FIG. 10 depicts a VMM obtained according to some embodiments of the described techniques for a photograph of Dick Cheney.
Figure 10B:
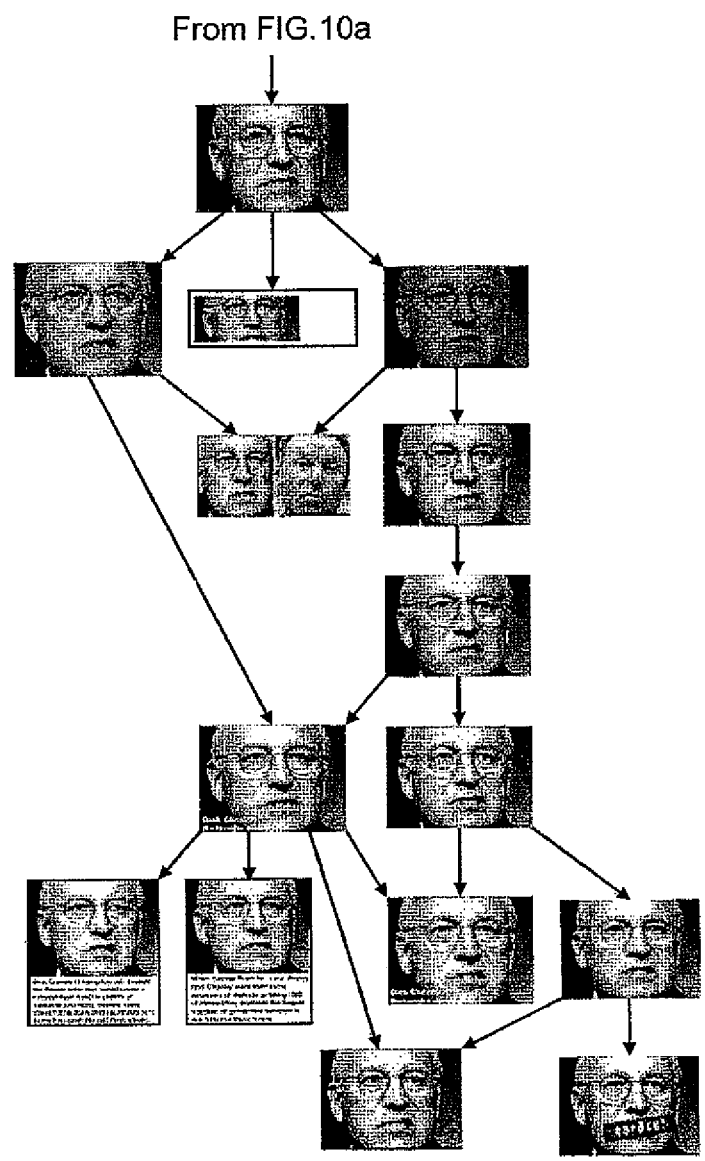

For each query, a VMM was constructed according to the Image Archaeology Techniques for the subset of images containing the largest number of connected images. For example, FIG. 9 shows an automatic VMM generated according to the described techniques for a photograph of Osama bin Laden, and FIG. 10 shows an automatic VMM obtained for a photograph of Dick Cheney.

In this example, an Intel Xeon 3.0 GHz machine was used, with the described techniques implemented in MATLAB®. It took about two hours to conduct copy detection and about 15 minutes to compute the VMM. The speed can be increased by using higher-performance copy detection approaches and/or optimized implementations.

A single human annotator provided ground-truth labels for the manipulations among the images, including scaling, cropping, insertion, overlay, and grayscale. The annotator inspected each pair of images and individually labeled whether any of these manipulations were present between the pair. If a manipulation was present, the annotator also labeled the directionality of the manipulation (i.e., which image was derived from the other). Most of these manipulations can be observed visually. For example, a grayscale image can be readily identified. Overlaying external content and insertion within other images also tend to be quite observable. The degree to which other manipulations can be observed can be subject to the magnitude of the manipulation. In scaling, if one image is downscaled by 50% compared to the other, then it should be obvious. A 1% downscaling would be harder to accurately notice, however. Therefore, as with any human-generated annotation, this data is subject to errors. However, it is still helpful to compare the results generated by the Image Archaeology Techniques against manually-generated results for verification of the robustness of the Image Archaeology Techniques. Given the manually determined individual manipulation labels for all of the pairs of images in the subset, a manually generated VMM was obtained.

The human annotator also annotated two properties of each individual image: its manipulation status and the viewpoint that it conveys. The first property, the manipulation status, simply reflects whether the image is one of the types of images shown in FIG. 2 ("original" or "highly manipulated"). These annotations were gathered by the annotator through scanning all of the images within a subset of connected images to gather an intuition about the appearance of the original image crop area and content. These classes are largely easy to observe and the annotations were quite reliable. The second property, the viewpoint conveyed by the image, is more subjective, and the content of the original HTML page from which the image was culled can be used to assist such an effort. For simplicity, the viewpoints of the document were labeled as either positive (supportive), neutral, or negative (critical) of the subject of the image.

The main image manipulation detectors of Image Archaeology Techniques were evaluated in terms of precision and recall by comparing their results against the ground-truth labels given by the human annotator. Precision is defined as the percentage of the automatically detected manipulations returned by the automatic image manipulation detectors that are manually labeled as true manipulations. Recall is defined as the percentage of manually-labeled ground-truth manipulations that are successfully detected by the automatic image manipulation detectors. Each of the methods relies on some predetermined threshold to make a binary decision. Examples of these thresholds can be the absolute magnitude of the detected manipulation, such as the percentage by which a scaling edit decreased the size of an image or the percentage of the image that is occupied by detected overlay pixels. Different threshold levels were scanned and the relative shifts in precision and recall were observed.

Figure 11:
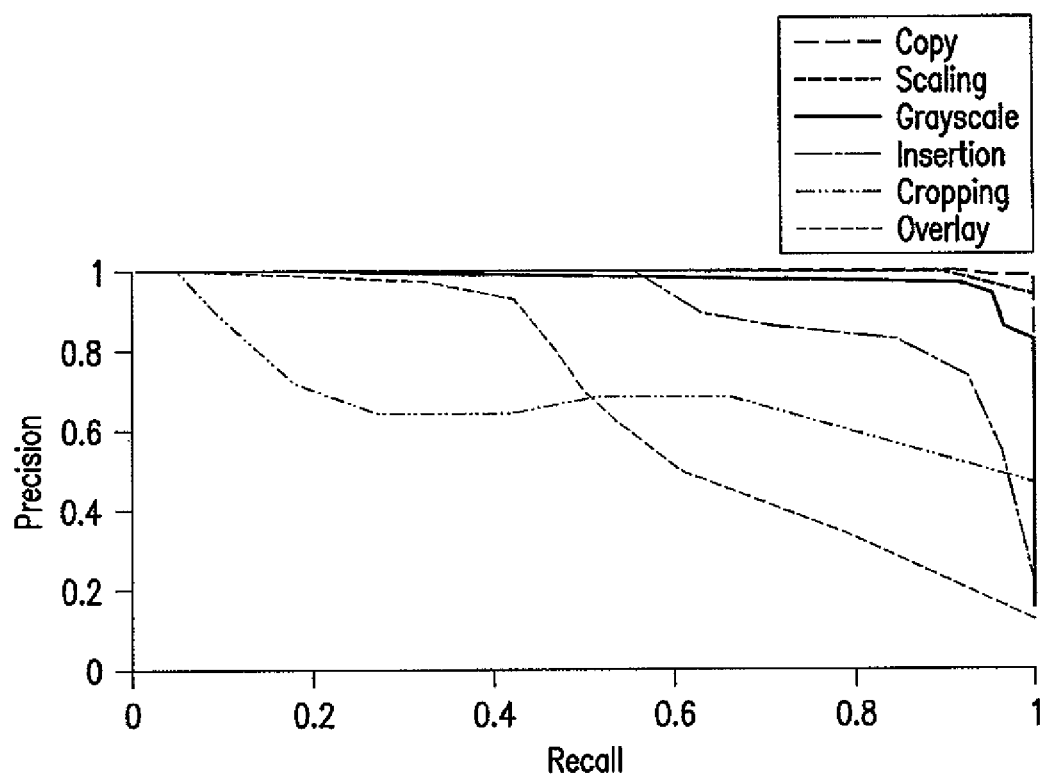
FIG. 11 illustrates the performance of some manipulation detectors according to some embodiments of the described techniques.

The precision-recall curves for each of the detectors across all of the 22 aforementioned queries are shown in FIG. 11. All of the basic, context-free detectors (copy detection, scaling, and color removal) have nearly perfect performance, each exceeding a precision in the range of 95% with recall in the range of 90%. The context-dependent detectors perform less well. The most successful among these detectors is the insertion detector, which retains fairly high precision through most recall ranges. The overlay detection method provides near-perfect precision up to a certain recall level and then falls off precipitously. The size and color contrast of an overlay was found to cause this effect: if overlays were large enough and different enough from the original image, then the method performed well. Smaller, less-perceptible overlays still remain as a challenge. Cropping detector provides a fair precision throughout all recall levels. Further observation of the errors also revealed that the performance of cropping might be underestimated because of the limitation on the quality of the manual annotation of cropping effects: when the cropping is minor, close inspection showed that the machine was correct and the human was in error.

Figure 12A:
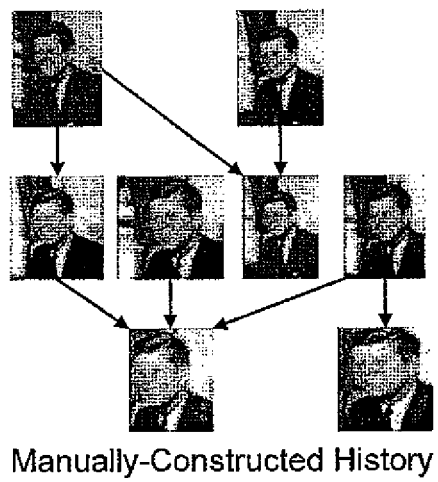
FIGS. 12a and 12b illustrate a comparison of a VMM obtained according to some embodiments of the described techniques (FIG. 12a) and a manually built VMM (FIG. 12b) for the same given set of images.
Figure 12B:
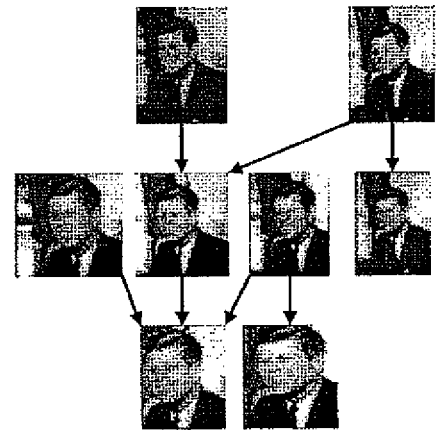

FIG. 12 shows an example comparison between a VMM constructed using the Image Archaeology Techniques ("automatic VMM") and a manually built VMM ("manual VMM") on the same set of images. There appears to be a great deal of agreement between the two VMMs.

Across all of the various image sets obtained through the aforementioned 22 queries, the automatic VMMs were compared against their corresponding manual VMMs. This evaluation was done with respect to the parent-child relationship between each pair of images. The manually-determined parent-child relationships (or the "edges" in the directed graph representation of a VMM) were used as ground truth; the correct detection of an edge between an image pair by the Image Archaeology Techniques was considered as a true positive and the incorrect detection by the Image Archaeology Techniques was considered as a false alarm. Again, the evaluation was similarly made in terms of precision and recall. On average, precision was 92% and recall was 71% for the existence of all of the parent-child relationships in the VMMs.

Figure 13:
FIG. 13 illustrates examples of summaries of discovered original and manipulated images according to some embodiments of the described techniques.

The VMMs emerging from a pool of collected images using the described Image Archaeology Techniques can help navigate and summarize the contents of the images in other search or exploration tasks. The "original"-type images can be the ones corresponding to source nodes (those with no incoming edges) in the graph structure, while the "highly-manipulated"-type images can be the ones corresponding to the sink nodes (those with no outgoing edges). The types of "highly-manipulated" images that are of most interest are the ones whose histories include a relatively large amount of information addition, which lead to changes in meaning and context. FIG. 13 shows examples of automatically discovered "original" and "manipulated" summaries.

Figure 14:
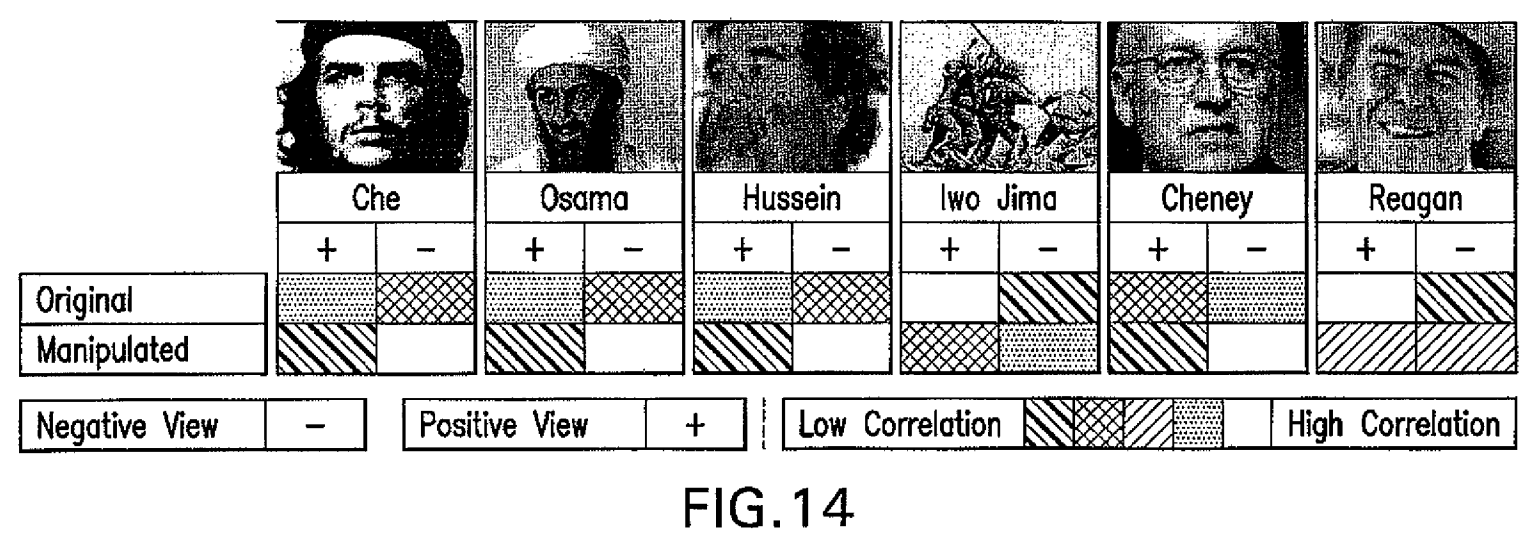

The VMMs obtained by the Image Archaeology Techniques can also enable users to browse varying perspectives within sets of images. FIG. 14 presents a summary of the correlations between image types ("original" or "manipulated") and the viewpoints represented by the web pages upon which they appear. The viewpoints were determined by a human, and were boiled down to simply "positive" (for cases in which the author takes a position specifically in favor of image subject, or the author is neutral and takes no position) or "negative" (for cases in which the author takes a position specifically opposed to the image subject). For many of the exemplary images, including "Che," "Osama," "Hussein," and "Iwo Jima," a correlation between the type of image and the viewpoint of the document can be observed. In these cases, the original-version images are highly associated with positive and neutral documents, while the manipulated images are associated with negative documents. This suggests that the status of the manipulation history of an image can indicate the meaning or perspective that it conveys. With some other images, manipulations are not observed to change the meaning as much. For the "Cheney" image, the original version is already unflattering and is frequently used as-is to convey negative viewpoints. In some cases, it is manipulated, and the resulting images are still associated with negative viewpoints. The "Reagan" image is rarely manipulated in the obtained images, so such a correlation is not easy to identify.

The foregoing merely illustrates the principles of the described subject matter. It will thus be appreciated that those skilled in the art will be able to devise numerous techniques which, although not explicitly described herein, embody the principles of the described subject matter and are thus within the spirit and scope of the described subject matter.

What is claimed is:

1. A method for determining manipulation history among a plurality of images, comprising:
   a) selecting a first image and a second image from the plurality of images;
   g) detecting if one or more manipulation are operable to transform the first image to the second image or the second image to the first image;
   e) determining an existence of a parent-child relationship between the first image and the second image based on the detection of the one of more manipulations, if any;
   g) presenting the determined existence of the parent-child relationship in a user readable format;
   e) determining the existence of a parent-child relationship for each pair of images in the plurality of images, and
   f) constructing a visual migration map for the plurality of images based on the determined existence of the parent-child relationship for each pair of images in the plurality of images prior to the presenting the determined parent-child relationship, wherein the presenting comprises presenting the visual migration map.

2. The method of claim 1, further comprising obtaining the plurality of images by manual collection.

3. The method of claim 1, further comprising obtaining the plurality of images by web-crawling.

4. The method of claim 1, further comprising obtaining the plurality of images by using an internet search engine.

5. The method of claim 1, further comprising obtaining a subset of images that are edited copies of one image from the plurality of images before selecting the first image and the second image, wherein selecting the first image and the second image is from the subset of images.

6. The method of claim 5, wherein obtaining a subset of images comprises using a copy detection technique, the copy detection technique comprising using a scale invariant feature transform descriptor.

7. The method of claim 1, wherein detecting if the one or more manipulations are operable to transform the first image to the second image or the second image to the first image comprises using one or more detectors selected from the group consisting of one or more context-independent detectors, one or more context-dependent detectors, and a combination thereof.

8. The method of claim 7, wherein the context-independent detectors are selected from the group consisting of a scaling detector, a grayscale detector, and a combination thereof.

9. The method of claim 7, wherein the context-dependent detectors are selected from the group consisting of a cropping detector, an insertion detector, an overlay detector, and a combination thereof.

10. The method of claim 7, wherein detecting if the one or more manipulations are operable to transform the first image to the second image or the second image to the first image further comprises using a copy detector.

11. The method of claim 10, wherein using the one or more context-dependent detectors comprises:
   constructing a composite image for each of the first image and the second image;

obtaining a residual image for each of the first image and the second image based on differences between each of the first image and the second image and its corresponding composite image;

using the obtained residue images to determine if the one or more manipulations are operable to transform the first image to the second image or the second image to the first image.

12. The method of claim 1, wherein the parent-child relationship is determined to be non-existent when no manipulations are detected.

13. The method of claim 1, wherein the parent-child relationship between the first image and the second image is determined to exist when only one manipulation is detected operable to transform the first image to the second image, the first image being identified as the parent and the second image being identified as the child.

14. The method of claim 1, wherein the parent-child relationship between the first image and the second image is determined to exist when a plurality of manipulations are detected, and each of the plurality of manipulations is operable to transform the first image to the second image, the first image being identified as the parent and the second image being identified as the child.

15. The method of claim 1, wherein the parent-child relationship between the first image and the second image is determined to be non-existent, when a plurality of manipulations are detected, and wherein at least one of the plurality of manipulations is operable to transform the first image to the second image, and wherein at least another of the plurality of manipulations is operable to transform the second image to the first image.

16. A non-transitory computer-readable medium comprising at least one software component that, when executed, performs a method comprising:

selecting a first image and a second image from a plurality of images;

detecting if one or more manipulations, are operable to transform the first image to the second image or the second image to the first image;

determining an existence of a parent-child relationship between the first image and the second image based on the detection of one of more manipulations, if any;

presenting the determined existence of the parent-child relationship, if any, in a user readable format;

determining the existence of a parent-child relationship for each pair of images in the plurality of images; and constructing a visual migration map for the plurality of images based on the determined existence of the parent-child relationship for each pair of images in the plurality of images prior to the presenting the determined parent-child relationship, wherein the presenting comprises presenting the visual migration map.

17. A system for determining image manipulation history, comprising:

a) an input device for receiving at least a first image and a second image;

b) one or more processing devices, at least one of which operably coupled with the input device, for detecting if one or more manipulations are operable to transform the first image to the second image or the second image to the first image; for determining an existence of a parent-child relationship between the first image and the second image based on the detection of the one of more manipulations, if any; and for constructing a visual migration map based on the detection of the one or more manipulations for each pair of images in the plurality of images; and c) a display device, operably coupled with one or more of the processing devices, for presenting the visual migration map in a user readable format.

\* \* \* \* \*